United States Patent [19]

Goodnow, II et al.

[11] Patent Number: 5,590,329
[45] Date of Patent: Dec. 31, 1996

[54] METHOD AND APPARATUS FOR DETECTING MEMORY ACCESS ERRORS

[75] Inventors: James E. Goodnow, II, Grass Valley, Calif.; Thaddeus J. Kowalski, Summit; James R. Rowland, Short Hills, both of N.J.

[73] Assignee: Lucent Technologies Inc., Murray Hill, N.J.

[21] Appl. No.: 192,239

[22] Filed: Feb. 4, 1994

[51] Int. Cl.⁶ .................................................. G06F 11/08
[52] U.S. Cl. ............................................................ 395/708
[58] Field of Search ...................................... 395/650, 700, 395/575

[56] References Cited

U.S. PATENT DOCUMENTS

| | | | |
|---|---|---|---|
| 5,107,418 | 4/1992 | Cramer et al. | 395/700 |
| 5,193,180 | 3/1993 | Hastings | 395/650 |
| 5,313,387 | 5/1994 | McKeeman et al. | 395/700 |
| 5,335,344 | 8/1994 | Hastings | 395/575 |
| 5,355,469 | 10/1994 | Sparks et al. | 395/575 |
| 5,361,351 | 11/1994 | Lenkov et al. | 395/700 |
| 5,432,936 | 7/1995 | Gray et al. | 395/700 |

OTHER PUBLICATIONS

Kanfer et al., "Saber–C An Interpreter–based Programming Environment for the C Language", Jun. 20–24, 1988, pp. 161–171.
Landi et al., "Aliasing with and without pointers: A Problem Taxonomy" Sep. 25, 1990, pp. 1–55.
Landi et al., "A Safe Approximate Algorithm for Interprocedural Pointer Aliasing", Jul., 1992, pp. 235–248.
Sulzman, "Saber–C ; A Sharp Programming Tool", Feb. 1990, pp. 105–109.
Steffen, "Adding Run–Time Checking to the Portable C Compiler", Apr. 1992, pp. 305–316.
Hipkins, Steven, The case of the Troublesome Switch (Case Study of Debugging application Software), Oct. 1, 1992, p. 39.
C Users Journal, Nu–Mega Announces Bounds Checker 2.0, for MS–DOS Memory Protections, p. 118.

*Primary Examiner*—Kevin A. Kriess
*Assistant Examiner*—John I. Chavis

[57] ABSTRACT

Disclosed is a software generation system (SGS) based memory error detection system which may be utilized to detect various memory access errors, such as array dimension violations, dereferencing of invalid pointers, accessing freed memory, reading uninitialized memory, and automated detection of memory leaks. Error checking commands and additional information are inserted into a parse tree associated with a source code file being tested at read-time which serve to initiate and facilitate run-time error detection processes. Wrapper functions may be provided for initiating error checking processes for associated library functions. A pointer check table maintains pointer information, including valid range information, for each pointer that is utilized to monitor the use and modification of the respective pointers. A memory allocation structure records allocation information, including a chain list of all pointers that point to the memory region and an initialization status for each byte in the memory region, for each region of memory. The chain list is utilized to monitor the deallocation of the associated memory region, as well as to detect when there is a memory leak. The initialization status is used to ensure that a region of uninitialized memory is not accessed. A data flow analysis algorithm minimizes the number of pointer checks that have to be performed and allows certain read-time errors to be detected.

12 Claims, 19 Drawing Sheets

| Pointer | Pointer Address | Contents of Pointer | Valid Memory Bounds | | Status | File/Line Number |
| --- | --- | --- | --- | --- | --- | --- |
| | | | Lower | Upper | | |
| ptr_part | 2048 | 1000 | 1000 | 1011 | Bounded | Testfile l60 |
| ptr_testint | 2086 | 1500 | 1500 | 1501 | Bounded | Testfile l90 |
| ... | | | | | | |
| ptr_alloc | 2200 | 3000 | 3500 | | Allocated | Testfile l210 |
| ... | | | | | | |
| ptr_testchar | 2090 | 1502 | 1502 | 1502 | Bounded | Testfile l1100 |

Testfile

⋮

| | |
|---|---|
| I10 | struct part { |
| I20 | int number; |
| I30 | char name [10]; |
| I40 | } widget; |
| I50 | struct part *ptr_part; |
| I60 | ptr_part = &widget; |

⋮

| | |
|---|---|
| I70 | int testint = 16394; |
| I80 | char testchar = 88; |
| I90 | int *ptr_testint = &testint; |
| I100 | char *ptr_testchar = &testchar; |

⋮

| | |
|---|---|
| I200 | char *ptr_alloc; |
| I210 | ptr_alloc = malloc (35 *sizeof (char)); |

⋮

| | |
|---|---|
| I300 | ptr_testchar = &widget.name[0]; |
| I310 | *ptr_testint = 12024; |

⋮

```
Sourcecode = Sample
    •
    •
    •
I10     struct part {
I20         int number;
I30         char name [10];
I40         char color;
I50     } widget;
I60     struct part *ptr_part;
I70     ptr_part = &widget;
I80     ptr_part→number = 860;
I90     strcpy ( ptr_part→name, " chair");
I100    ptr_part→color ='b';
    •
    •
    •
I150    ptr_part = 0;
I160    ptr_part→number = 870;
    •
    •
    •
```
FIG. 14a
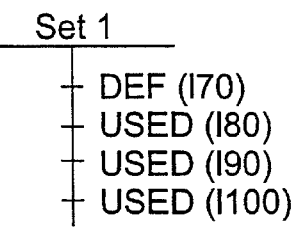
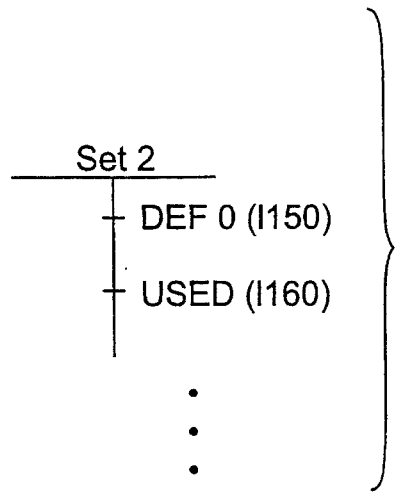
FIG. 14b

METHOD AND APPARATUS FOR DETECTING MEMORY ACCESS ERRORS

FIELD OF THE INVENTION

The present invention relates to a system for testing and debugging software programs, and more particularly, to a method and apparatus for detecting memory access errors in both interpreted source code and compiled object code.

BACKGROUND OF THE INVENTION

Today's world of computer programming offers many high-level programming languages. The flexibility and power offered by programming languages such as C, C++ and Pascal, however, have made these languages very popular among programmers. These programming languages place few, if any, constraints on what a programmer can implement in software, allowing a program to perform virtually any task that may be performed by the underlying assembly language.

One feature of these programming languages which offers significant power and flexibility is the ability to access memory by means of pointers, without restriction. The unrestricted use of pointers, however, invites program bugs which are often difficult to detect and correct with conventional debugging techniques.

A number of software testing and debugging tools have been developed for detecting various memory access errors. For example, the Purify™ software testing tool, commercially available from Pure Software, Inc., of Sunnyvale, Calif., and described in U.S. Pat. No. 5,193,180, provides a system for detecting memory access errors and memory leaks. The Purify™ system monitors the allocation and initialization status for each byte of memory.

In addition, the Purify™ system establishes eight byte buffer zones before and after each block of allocated memory in order to facilitate the detection of array bound violations and similar memory access errors. The status of each byte in the buffer zone is set to an unallocated and uninitialized state. For each instruction that accesses memory, the Purify™ system performs a test to ensure that the program is not writing to unallocated memory, and is not reading from uninitialized or unallocated memory.

While the Purify™ system provides an effective basis for detecting many memory access errors, it will not detect the common programming error that occurs when a pointer associated with a first block of allocated memory incorrectly accesses a second block of allocated and initialized memory. The Purify™ system will only verify that the memory pointed to by a pointer is allocated and initialized, and will not verify that the memory pointed to by the pointer is within the proper bounds that have been established for that pointer.

Other software testing and debugging tools have been developed which have attempted to overcome this limitation. For example, the compiler-based memory access error detection system described in Joseph L. Steffen, "Adding Run-time Checking to the Portable C Compiler," Software-Practice and Experience, Vol. 22(4), Apr. 1992, pp. 305–316, utilizes three words for each pointer, so that the pointer may include information on the valid range of the pointer. Thus, each time a pointer accesses memory, a check may be performed to ensure that the memory pointed to by the pointer is within the proper bounds for the respective pointer.

Many programmers, however, prefer to test and debug their software in an interpreter environment, as opposed to a compiler environment, because interpreter-based debugging is typically more flexible and provides greater assistance during debugging, i.e., by providing sophisticated tracing and other diagnostic techniques. Perhaps even more common is partial interpretation, wherein some files are comprised of interpreted source code while others files are comprised of compiled object code.

However, software debugging tools that operate in a partial interpreter environment, such as the Centerline CodeCenter system, formerly known as the Saber-C™ system, commercially available from Centerline Software, Inc., typically have the same limitations with respect to error checking of the compiled object code as the Purify™ system discussed above. Specifically, these partial interpretation debugging tools will typically only verify that the memory pointed to by a pointer within compiled object code is allocated and initialized, and will not verify that the memory pointed to by the pointer is within the proper bounds that have been established for that pointer.

As is apparent from the above deficiencies with the prior art, a need exists for a software testing and debugging tool that is capable of performing error detection tasks while executing both interpreted source code and compiled object code. A further need exists for a software testing and debugging tool that ensures that the memory pointed to by a given pointer is within the proper bounds for the respective pointer. In addition, a need exists for a more efficient software testing and debugging tool that reduces the number of duplicative or overlapping pointer checks that are performed at run-time by utilizing information that is derived at read-time or parse time.

SUMMARY OF THE INVENTION

Generally, according to one aspect of the invention, a software testing and debugging tool is provided for detecting a number of memory access errors in a software program, such as array dimension violations, dereferencing of invalid pointers, accessing freed memory, reading uninitialized memory, and automated detection of memory leaks. In addition, diagnostic information is provided that facilitates the identification and correction of detected errors.

Another aspect of the invention provides a system for recording pointer information for each pointer in a software program. The recorded pointer information preferably includes, e.g., the address and contents of the associated pointer, as well as the range of memory where the associated pointer may validly point. The recorded pointer information is utilized to monitor the use and modification of the associated pointers.

In addition, a system is provided for recording allocation information for each region of allocated memory. The recorded allocation information preferably includes, e.g., a chain list of all of the pointers currently pointing to the associated region of allocated memory, as well as an initialization bit vector which maintains the initialization status of each byte of the associated region of allocated memory.

A read-time error checking process analyzes each line of the parse tree associated with the interpreted source code. The read-time error checking process will insert error checking commands and additional information into the parse tree, as appropriate, in response to each pointer assignment or pointer dereference that appears in the interpreted source code.

A run-time error checking process will initiate an update of the appropriate recorded pointer information for each error checking command that has been inserted into the parse tree in response to a pointer assignment. Similarly, for each error checking command that has been inserted into the parse tree in response to a pointer dereference, the run-time error checking process will initiate a pointer check of the pointer information that has been recorded for the dereferenced pointer. The run-time pointer check will evaluate the recorded pointer information for the dereferenced pointer and detect if the dereferenced pointer is pointing outside its valid memory space.

According to a further feature of the invention, error checking processes may be performed on compiled object code functions by means of interpreted wrapper functions that may be associated with a compiled function that requires error checking. The wrapper functions may be executed before and/or after the associated compiled function, as necessary, to implement the necessary error checking processes.

A pre-execution wrapper function is preferably associated with each compiled function that is known to dereference a pointer during execution of the compiled code, in order to initiate a pointer check for each dereferenced pointer. Pre-execution wrapper functions may perform additional error checking on arguments that are passed to a compiled function, as well.

A post-execution wrapper function is preferably associated with each compiled function that is known to create a pointer during the execution of the compiled code, as well as with each compiled function that is known to return a pointer value that is subsequently assigned to a pointer upon return by the calling function. If the associated compiled function creates a pointer, the post-execution wrapper function preferably records the pointer information for the created pointer in the appropriate memory location. If the associated compiled function is returning a pointer value to the calling function, the post-execution wrapper function preferably places the necessary pointer information in a pointer save stack, for subsequent retrieval during execution of the calling function.

According to a further feature of the invention, a method is provided for detecting when a region of deallocated memory is accessed. Upon the deallocation of a region of allocated memory, the chain list that is included in the allocation information associated with the region of memory is accessed to obtain the list of all of the pointers currently pointing to the region of allocated memory. Thereafter, an indication is recorded in the pointer information associated with each pointer listed in the chain list that the pointer is now pointing to a region of memory that has been deallocated. Thus, an error is detected if a pointer is dereferenced while containing an indication that the pointer is pointing to a deallocated memory space.

According to another feature of the invention, a method is provided for detecting when a region of uninitialized memory is being read. Each time one or more bytes of a region of allocated memory is initialized by interpreted source code, the initialization bit vector in the allocation information for the associated region of memory is updated to indicate that the corresponding bytes of memory have been initialized. An initialization bit vector maintenance subroutine is performed each time a compiled function is executed that may initialize memory. The initialization bit vector maintenance subroutine detects the initialization of one or more bytes of memory by the compiled function and updates the initialization bit vector to indicate that the corresponding bytes of memory have been initialized. Each time a pointer is dereferenced to read a region of memory, the initialization bit vector is evaluated to determine if the region of memory being read has been initialized.

Another feature of the invention allows a memory leak to be detected automatically. The chain list included in the allocation information associated with each region of allocated memory is updated each time a pointer assignment modifies the list of pointers currently pointing to the region of allocated memory. A memory leak is identified if the chain list is empty.

Yet another feature of the invention utilizes a data flow analysis to minimize the number of pointer checks that have to be performed at run-time by eliminating duplicative, i.e., overlapping, pointer checks from the read-time parse tree. In addition, the data flow analysis allows the dereferencing of a null or uninitialized pointer to be detected at read-time.

A more complete understanding of the present invention may be had by reference to the following Detailed Description with the accompanying drawings.

BRIEF DESCRIPTION OF THE DRAWINGS

FIG. 2a illustrates a pointer check table that maintains current pointer information for each pointer that is declared in the sample source code file of FIG. 2b;

FIG. 2b illustrates the sample source code file that declares and initializes the pointers listed in the pointer check table of FIG. 2a;

FIG. 12b is a flow chart describing an exemplary initialization bit vector maintenance subroutine as utilized by the compiled function error checking process of FIG. 12a;

FIG. 13 is a flow chart describing an exemplary diagnostic subroutine as utilized by the run-time pointer checking subroutine of FIGS. 11a and 11b;

FIG. 14a illustrates a sample source code file that declares and initializes a pointer, ptr_part; and FIG. 14b illustrates the flow sets that are established during the data flow analysis of the source code illustrated in FIG. 14a.

DETAILED DESCRIPTION

Figure 1:
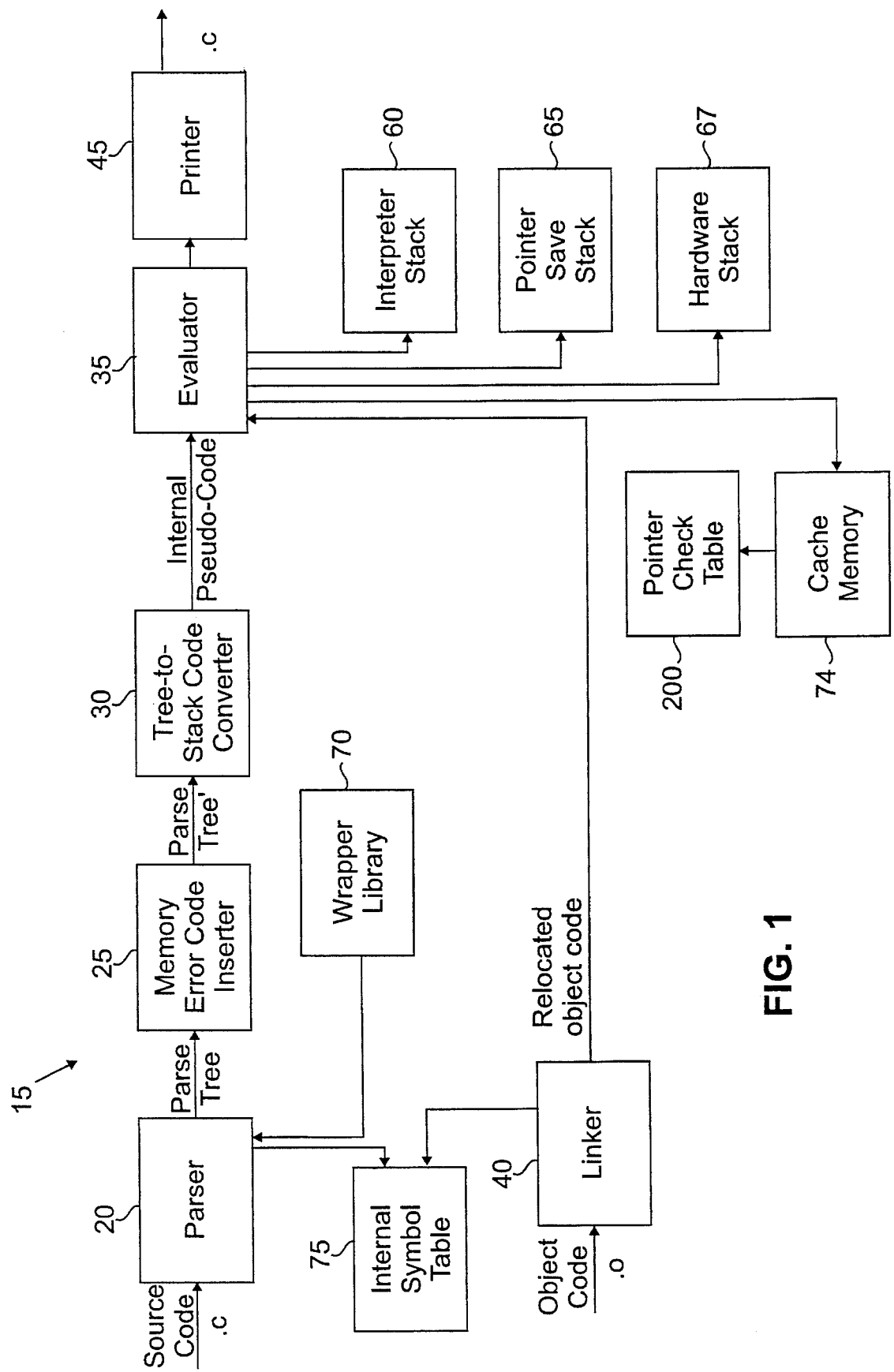
FIG. 1 is a schematic block diagram illustrating a memory access error detection system according to the present invention.

A memory error detection system according to the present invention is illustrated in FIG. 1. The memory error detection system disclosed herein is a software generation system (SGS) based software testing and debugging tool. The software generation system may be embodied as an interpreter or a compiler or a similar system capable of translating source code into an executable format.

The memory error detection system analyzes a software program being tested in order to detect various memory access errors, including, e.g., array dimension violations, dereferencing of invalid pointers, accessing freed memory, reading uninitialized memory, and automated detection of memory leaks. In addition, the memory error detection system provides diagnostic information that facilitates the identification and correction of detected errors.

The invention will be described in five main sections as follows. First, an introductory section will initially describe the memory error detection system relative to the schematic block diagram of FIG. 1. The introductory section will include a detailed description of a pointer check table 200, shown schematically in FIG. 1 and in greater detail in FIG. 2a. The pointer check table 200 shown in FIG. 2a has been populated with data from an associated example discussed relative to FIGS. 2b through 2e.

Second, the read-time error checking processes of the present invention, as executed by a memory error detection code inserter 25 shown in FIG. 1, will be described in a section entitled READ-TIME ERROR CHECKING OPERATIONS. The read-time error checking processes are discussed relative to FIGS. 3 through 6. This section concludes with a discussion relative to FIGS. 14a and 14b of a data flow analysis that may be performed at read-time to minimize the number of pointer checks that have to be performed at run-time and to allow certain read-time errors to be detected.

Third, preferred embodiments for implementing error checking on compiled function will be described in a section entitled ERROR CHECKING OF COMPILED OBJECT CODE. This section will include a discussion of interpreted wrapper functions which may be executed to perform error checking tasks on associated compiled functions, as necessary. A preferred pre-execution wrapper function that may be associated with each compiled memory deallocation function is also discussed relative to FIG. 7.

Fourth, the run-time error checking processes of the present invention, as executed by an evaluator 35 shown in FIG. 1, will be described in a section entitled RUN-TIME ERROR CHECKING OPERATIONS. The run-time error checking processes are discussed relative to FIGS. 8 through 13.

Finally, a method for detecting memory leaks and a method for identifying the source of undetected pointer modifications by compiled functions are then described in a section entitled IDENTIFYING MEMORY LEAKS AND THE SOURCE OF UNDETECTED POINTER MODIFICATIONS.

As shown in FIG. 1, the memory error detection system preferably employs an interpreter 15, such as the CIN interpreter for the C programming language, commercially available from AT&T, as modified herein to provide error checking facilities. As discussed further below, the interpreter 15 performs error detection tasks while executing both interpreted source code and compiled object code.

The source code received by the interpreter 15 is analyzed at read-time by a parser 20 which converts the source code into well-known parse trees. In addition, as the source code is read into program memory, an internal symbol table 75 is created by the parser 20. The internal symbol table 75 includes an entry for each symbolic label defined in the source code, in a known manner. Each entry in the internal symbol table 75 identifies the associated symbolic label and includes the address of the memory location that has been allocated for the respective symbolic label.

A memory error detection code inserter 25 is provided to perform read-time error checking processes, discussed further below relative to FIGS. 3 through 6, on the parse tree generated by the parser 20. As discussed further below, the memory error detection code inserter 25 analyzes the parse tree derived from the source code and, where appropriate, inserts error checking commands and additional information into the parse tree that will be evaluated at run-time. The modified parse tree generated by the memory error detection code inserter 25, which includes the inserted error checking commands and additional information, is then entered into a tree-to-stack code converter 30. The tree-to-stack code converter 30 generates the internal pseudo-code, which is essentially in a machine language format.

As indicated above, the interpreter 15 preferably performs error detection tasks while executing both interpreted source code and compiled object code. Thus, a linker 40 is provided, which relocates compiled object code. As the object code is loaded into program memory by the linker 40 at read-time, the internal symbol table 75 is updated to include entries for each symbolic label defined in the object code, in the manner described above.

At run-time, the evaluator 35 utilizes an interpreter stack 60 to execute the internal pseudo-code that has been generated by the tree-to-stack code converter 30, as well as any compiled object code that may be called from the interpreted internal pseudo-code, in a manner described further below. In order to monitor the output of the evaluator 35, a printer 45 is provided, which may list the internal pseudo-code programs that are executed by the evaluator 35 in a source code format.

According to a feature of the invention, the evaluator 35 will generate a pointer check table 200, discussed further below relative to FIG. 2a, based on the commands and information that were placed in the internal pseudo-code during read-time, as well as on run-time conditions. The pointer check table 200 records information for each pointer that is utilized to monitor the use and modification of the respective pointers.

In addition, pointer information can be temporarily stored by the evaluator 35 in a cache memory 74, i.e., an area of very fast memory, for anticipated future use by the evaluator 35. In a preferred embodiment, the cache memory 74 will store the address of the two pointers that have been referenced most recently. In this manner, when these values are subsequently needed by the evaluator 35 during run-time operations, discussed below, they can be transferred directly to the evaluator 35, thereby increasing operating speed. If the desired pointer information is not found in the cache memory 74, then the pointer check table 200 will be accessed preferably using a bucket hash lookup algorithm where the buckets are sorted by most recent pointer update.

A well-known hardware stack 67 may be accessed by the evaluator 35, e.g., to store the arguments of functions being executed by the evaluator 35. In addition, while implementing preferred embodiments of the run-time error checking operations, the evaluator 35 will access a pointer save stack 65, which will be discussed further below.

A wrapper library 70, discussed further below in the section entitled ERROR CHECKING OF COMPILED OBJECT CODE, is preferably provided for storing interpreted pre-execution and post-execution wrapper functions which may be associated with compiled functions. The interpreted pre-execution and post-execution wrapper functions permit error checking processes to be performed, as necessary, on the associated compiled functions.

As discussed further below in the section entitled RUN-TIME ERROR CHECKING OPERATIONS, the appropriate entries of the pointer check table 200 will be updated at run-time by the evaluator 35 each time a pointer is assigned a new value. In this manner, the pointer check table 200 will record current pointer information for each pointer.

Figure 11A:
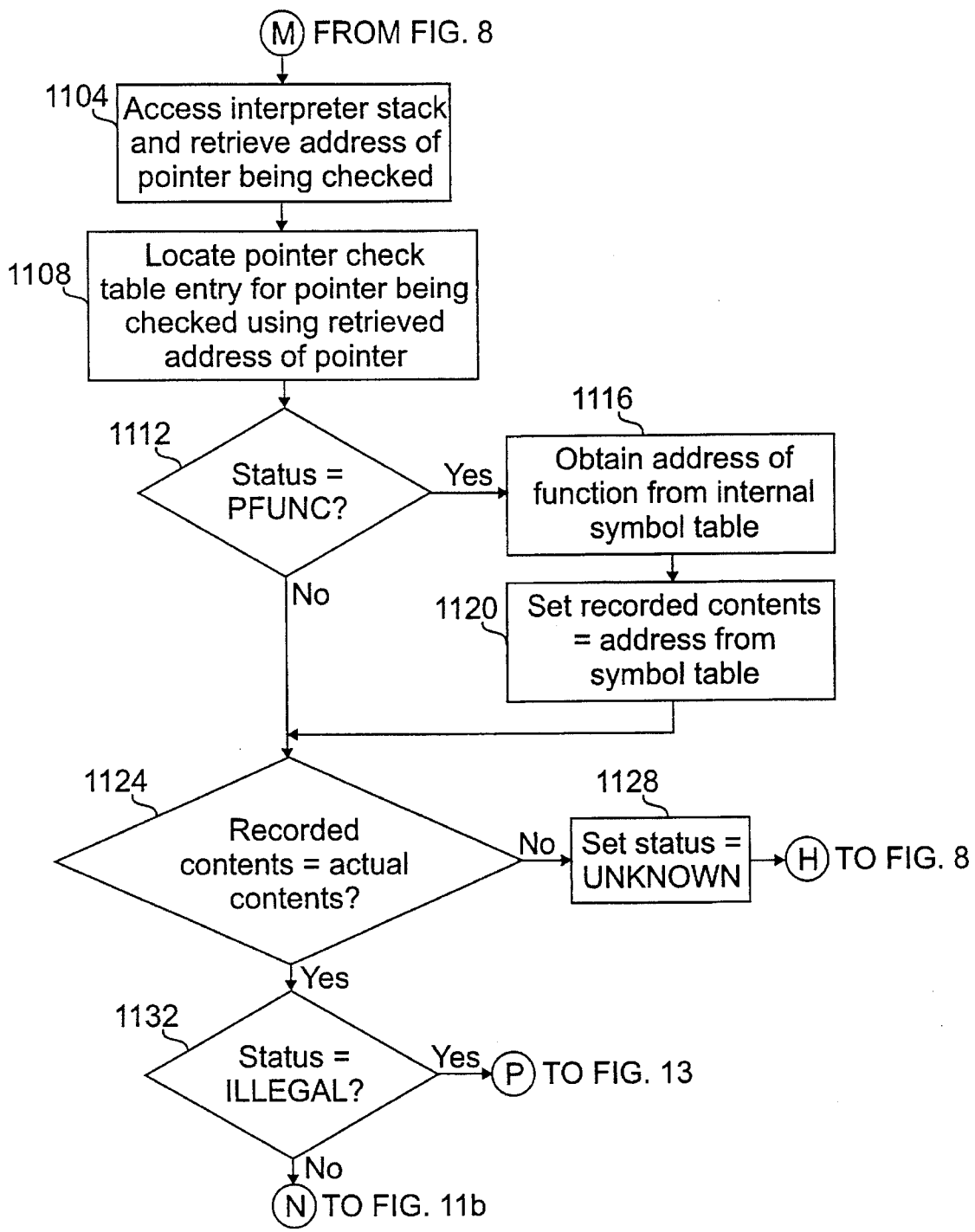
FIGS. 11a and 11b, collectively, are a flow chart describing an exemplary run-time pointer checking subroutine as utilized by the error checking process of FIG. 8.
Figure 11B:
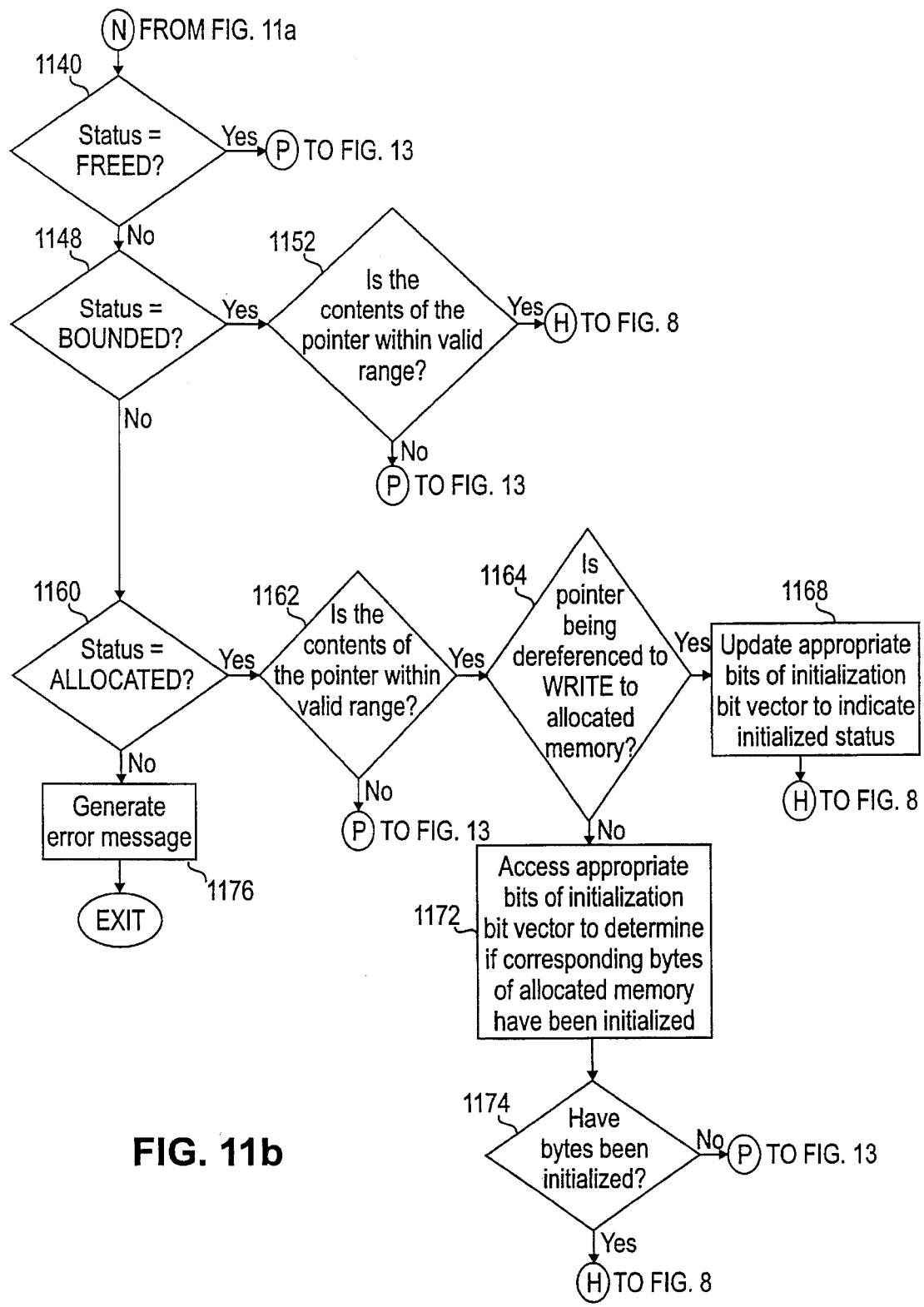

As is well-known, however, conventional interpreters are not normally aware of modifications made to pointer values by compiled object code. Thus, according to one aspect of the invention, a post-execution wrapper function, discussed below in the section entitled ERROR CHECKING OF COMPILED OBJECT CODE, is preferably executed following execution of an associated compiled function that is known to modify a pointer value in order to update the appropriate entries in the pointer check table 200 with the modified pointer information. In addition, a run-time pointer checking subroutine, discussed below relative to FIGS. 11a and 11b, provides a supplemental mechanism at steps 1124 and 1128 for detecting and flagging a previously undetected modification of a pointer value when the new pointer value is subsequently used.

A pointer check table, such as the pointer check table 200 illustrated in FIG. 2a, will include a plurality of rows, such as rows 220, 222, 224, each associated with a different pointer. Each row of the pointer check table 200 will include a plurality of entries for storing information on the associated pointer. An entry 230 will store the address where the associated pointer is stored in memory. Similarly, an entry 240 will store the contents of the associated pointer. An entry 250a will record the valid lower memory bound of the associated pointer, while an entry 250b will record the valid upper memory bound. A status entry 260 will record one of a number of predefined status codes, discussed further below, for the associated pointer. Finally, a file/line number entry 270 will record a pointer to the file name and line number associated with the last modification of the pointer, which is utilized to provide diagnostic information upon error detection.

For illustrative purposes, the pointer check table 200 shown in FIG. 2a has been populated with the pointer information associated with the pointers that are declared and initialized upon the execution of lines 10 through 210 of the sample source code, test file, shown in FIG. 2b. It is noted that it is assumed that the sample source code, testfile, is operating on a machine that allocates two bytes for each integer variable and one byte for each character variable.

Figure 2C:
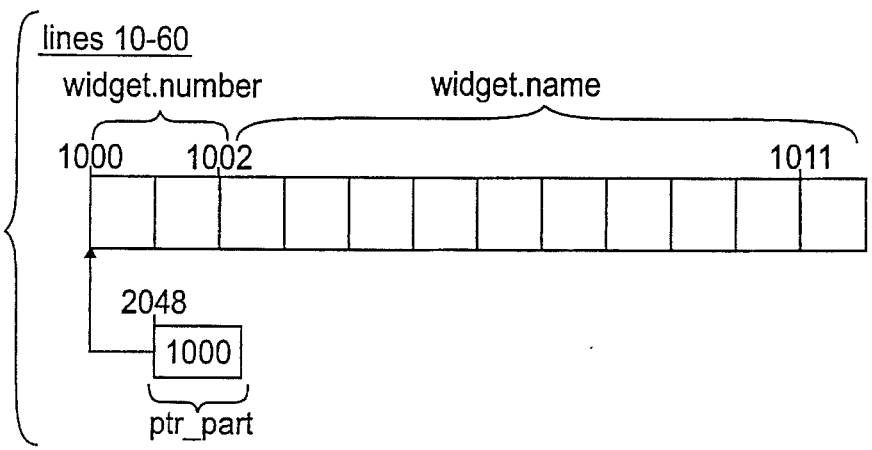
FIGS. 2c and 2d illustrate the relationship between a number of pointers and the respective memory spaces pointed to by the pointers, following execution of lines 10 through 60 and 70 through 110, respectively, of the source code of FIG. 2b.

During execution of lines 10 through 40 of the source code, testfile, shown in FIG. 2b, a structure, widget, of type part and having an integer member, number, and a character array member, name, is declared. A pointer, ptr_part, is declared in line 50. During execution of line 60, the pointer, ptr_part, is assigned to point at the address of the widget structure. This pointer assignment in line 60 will cause the pointer information for the pointer, ptr_part, to be placed in the pointer check table 200. The memory allocations that result from execution of lines 10 through 60 are shown in FIG. 2c.

As seen in FIG. 2c, the pointer, ptr_part, has been allocated an address of 2048, which is placed in the address of pointer entry 230 of the pointer check table 200 for the pointer, ptr_part. The pointer, ptr_part, has been assigned to point at the address of the structure, widget, i.e., an address of 1000, which is placed in the contents of pointer entry 240 for the pointer, ptr_part. Since the pointer, ptr_part, may validly be assigned to point anywhere within the structure, widget, i.e., any address in the range 1000 through 1011, this information is placed in the valid memory bounds entries 250a, 250b.

The status entry 260 in the pointer check table 200 is preferably updated to indicate that the pointer, ptr_part, is pointing to a BOUNDED range, in a manner described further below. The file/line number entry 270 preferably is updated to indicate that the pointer, ptr_part, was last updated by the source code, testfile, at line 60.

During execution of lines 70 and 80 of the source code, testfile, shown in FIG. 2b, two variables are declared, an integer variable, testint, and a character variable, testchar, respectively. A pointer, ptr_testint, is declared and assigned in line 90 to point to the integer variable, testint. A pointer, ptr_testchar, is declared and assigned in line 100 to point to the character variable, testchar. The pointer assignments in lines 90 and 100 will cause the pointer information for the pointers, ptr_testint and ptr_testchar, to be placed in the pointer check table 200. The memory allocations that result from execution of lines 70 through 100 are shown in FIG. 2d.

Figure 2D:
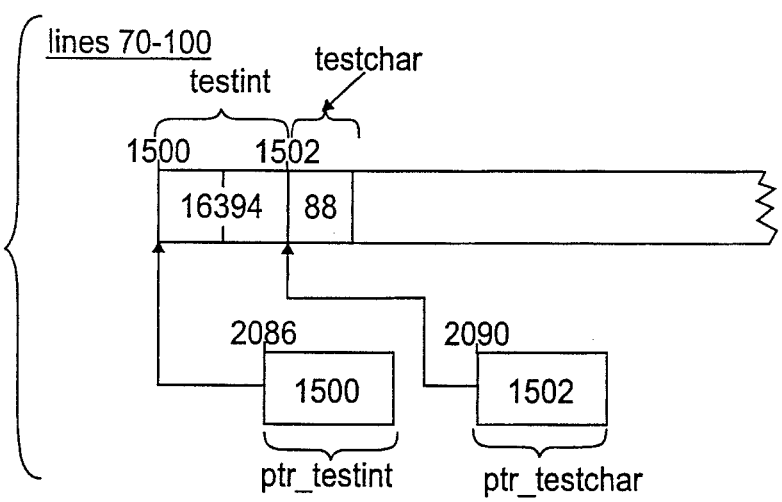

As seen in FIG. 2d, the pointer, ptr_testint, has been allocated an address of 2086, while the pointer, ptr_testchar, has been allocated an address of 2090. This information is placed in the address of pointer entry 230 of the pointer check table 200 for each pointer, ptr_testint and ptr_testchar. The pointer, ptr_testint, has been assigned to point at the variable, testint, i.e., an address of 1500, while the pointer, ptr_testchar, has been assigned to point at the variable, testchar, i.e., an address of 1502. This information is placed in the contents of pointer entry 240 in the pointer check table 200 for each pointer, ptr_testint and ptr_testchar.

Since the pointer, ptr_testint, may point only at the two byte integer variable, testint, i.e., within the address range of 1500 through 1501, this information is placed in the valid memory bounds entries 250a, 250b for the pointer, ptr__testint. Similarly, the pointer, ptr__testchar, may point only at the one byte character variable, testchar, i.e., the one byte address 1502. Thus, this information is placed in the valid memory bounds entries 250a, 250b in the pointer check table 200 for the pointer, ptr__testchar.

The status entries 260 in the pointer check table 200 for the pointers, ptr__testint and ptr__testchar, are preferably updated to indicate that the respective pointers are pointing to BOUNDED ranges, in a manner described further below. The file/line number entries 270 preferably are updated to indicate that the pointers were last updated by the source code, testfile, at lines 90 and 100, respectively.

The execution of lines 200 through 210 of the source code, testfile, which allocates 35 bytes of memory using the compiled library function, malloc, and then returns the value of the starting address of the allocated memory to the declared pointer, ptr__alloc, as well as the resultant memory allocations illustrated in FIG. 2e, will be discussed below in the section entitled ERROR CHECKING OF COMPILED OBJECT CODE.

During execution of line 300 of the source code, testfile, shown in FIG. 2b, the pointer, ptr__testchar, which was previously assigned a value in line 100, as previously discussed, is reassigned in line 300 to point to a member of the widget structure. Thus, the information in the pointer check table 200 for the pointer, ptr__testchar, must be updated with the new pointer information associated with the assignment. Thus, following execution of line 300 the "contents of pointer" entry 240 for the pointer, ptr__testchar, should be updated to indicate that the pointer now points to the address of the structure member widget.name, i.e., 1002.

It is noted that if a first structure containing pointer members is copied into a second structure, the pointer information that has been recorded in the pointer check table 200 for the pointer members in the first structure should be appropriately placed in the entries for the pointer members in the second structure.

According to a feature of the invention, the above-described pointer check table 200 is utilized each time a pointer is dereferenced, i.e., when the memory pointed to by the pointer is accessed, in order to ensure the validity of the pointer value. For example, upon execution of line 310 of the source code testfile, shown in FIG. 2b, the pointer, ptr__testint, will be dereferenced so that the constant 12024 may be written in the address pointed to by the pointer, ptr__testint. As discussed further below, just before the memory location pointed to by the pointer is accessed, the memory error detection system will test the validity of the pointer contents to ensure that the pointer, ptr__testint, is pointing to a valid memory location, i.e., within the valid bounds 1500 through 1501, as recorded in the valid bounds entries 250a, 250b for the pointer, ptr__testint.

In a preferred embodiment, two separate pointer check tables 200 are maintained, with one table recording information about static pointers and the second table recording information about automatic pointers. Since automatic pointers are only known within the particular function in which they are defined, it is more efficient to record the associated pointer information in a separate table. Thus, after execution of each function, the automatic pointer check table 200 may be reinitialized.

The pointer check table 200 is preferably preloaded with pointer information for two classes of pointers: static pointers that are initialized to point at static data and the argv pointer argument that is passed to the main function. Since the execution of these lines of source code would not normally implicate the pointer table updating mechanism described below, they are preferably automatically preloaded into the pointer check table 200 prior to running the internal pseudo-code.

READ-TIME ERROR CHECKING OPERATIONS

Figure 3:
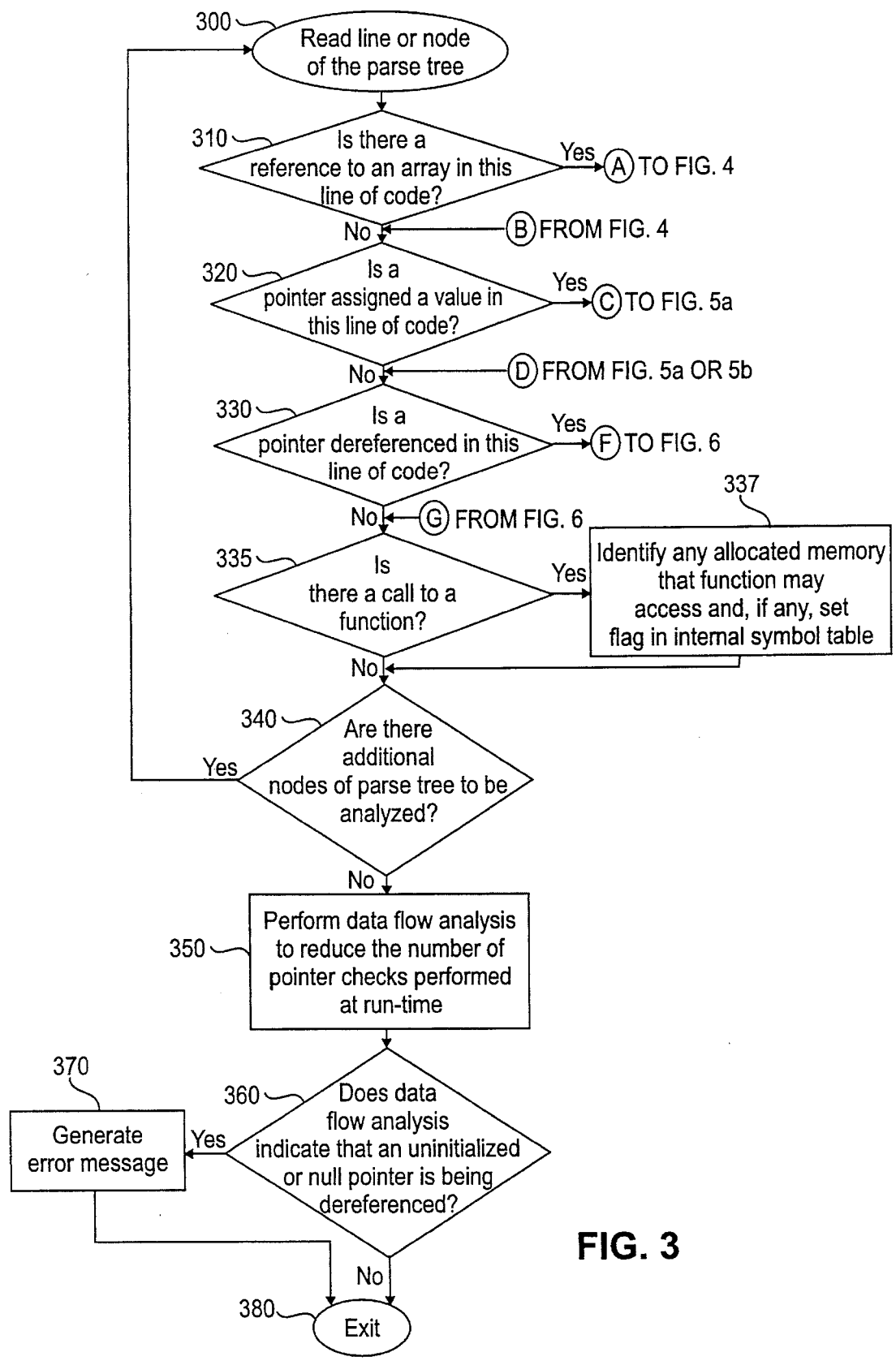
FIG. 3 is a flow chart describing an exemplary read-time error checking process as utilized by a memory error detection code inserter in analyzing a parse tree.

As the memory error detection code inserter 25 reads each line of the parse tree, it implements a read-time error checking process, illustrated in FIG. 3. The read-time error checking process evaluates each line, or node, of the parse tree in order to perform certain read-time error checking tasks which will insert certain error checking commands and additional information into the parse tree. Essentially, the read-time error checking processes implemented by the memory error detection code inserter 25 perform preliminary tasks which serve to initiate and facilitate the actual error detection processes performed at run-time, discussed below relative to FIGS. 8 through 13.

The read-time error checking process determines which, if any, error checking subroutines should be performed for the line of code being evaluated, as illustrated in FIG. 3. In general, after entering the read-time error checking process at step 300, wherein each line of the parse tree is read, a read-time array dimension checking subroutine, discussed below relative to FIG. 4, will be executed if the condition of step 310 is satisfied. Similarly, a read-time pointer table updating subroutine, discussed below relative to FIGS. 5a and 5b, will be executed if the condition of step 320 is satisfied. A read-time pointer checking subroutine, discussed below relative to FIG. 6, will be executed if the condition of step 330 is satisfied. Finally, an appropriate flag, discussed below, will be set during step 337 if the condition of step 335 is satisfied.

In addition, once the memory error detection code inserter 25 has read and analyzed all of the lines of the parse tree as detected during step 340, the read-time error checking process will perform a data flow analysis, discussed further below, during steps 350 and 360, which will reduce the number of pointer checks that need to be performed at run-time and allow certain read-time errors to be detected.

Figure 4:
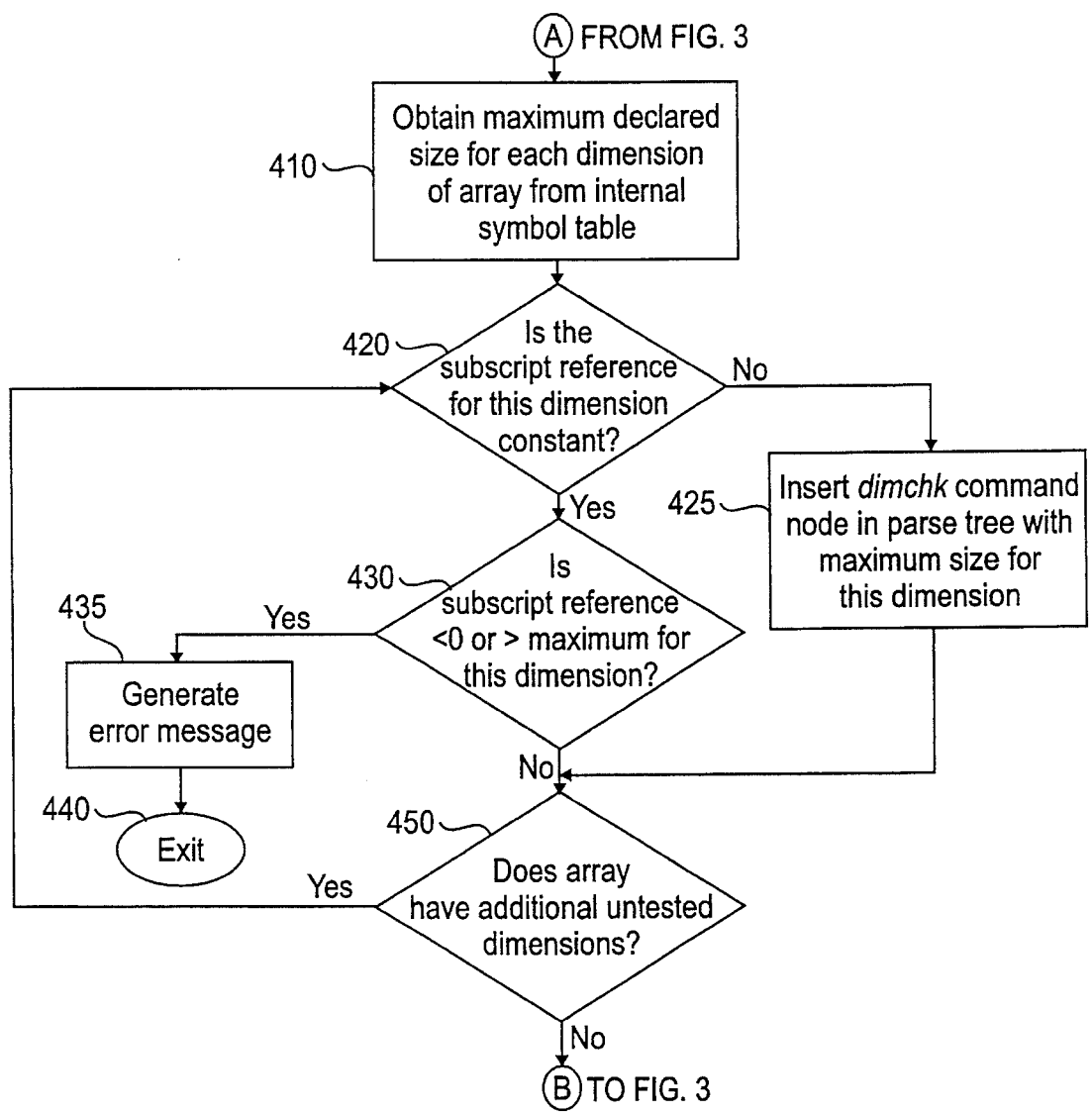
FIG. 4 is a flow chart describing an exemplary read-time array dimension checking subroutine as utilized by the error checking process of FIG. 3.

The read-time array dimension checking subroutine, illustrated in FIG. 4, will be entered at step 410 if the line of source code being evaluated by the read-time error checking process includes a reference to a declared array, as detected during step 310 (FIG. 3).

The read-time array dimension checking subroutine will determine if illegal subscripts, i.e., negative subscripts or subscripts that exceed the declared size of the array, are being utilized to reference an array. Since it is possible in many programming languages to exceed the range of a single dimension of a multi-dimension array, yet still fall within the total range of the array, checks are performed upon each dimension to ensure that its proper bounds are maintained. It is noted that the maximum valid array subscript is typically one less than the declared size of the array for that dimension, because the first valid subscript of an array for many programming languages is 0 and not 1.

During step 410, the array dimension checking subroutine of FIG. 4 will obtain the maximum declared size for each dimension of the array from the internal symbol table 75. If a subscript reference is variable, the value of the subscript reference is unknown at read-time and cannot be evaluated until the reference is evaluated at run-time. Thus, a test is initially performed at step 420 to determine whether the subscript reference for a dimension of the array is a constant or a variable.

If it is determined during step 420 that the subscript reference is a constant, the constant value which appears in the line of code will be compared against the maximum value for this dimension during step 430. If it is determined during step 430 that the constant reference exceeds the declared maximum value for this dimension or is a negative value, an error message will be generated in step 435, and the process will be exited at step 440.

If it is determined during step 430 that the constant subscript reference is valid, program control will proceed to step 450 for a determination of whether there are additional dimensions of this array to be tested, i.e., for multi-dimension arrays. If it is determined during step 450 that there are additional dimensions to be tested, program control will return to step 420 for testing of the remaining dimensions, in the manner described above. If it is determined during step 450 that there are no remaining dimensions to be tested, program control will return to the read-time error checking process at step 320 (FIG. 3).

If it is determined during step 420 (FIG. 4) that the array reference is variable, a dimchk command node is preferably inserted into the parse tree during step 425, together with the maximum allowed size for the respective dimension which has been retrieved from the internal symbol table 75 during step 410. The dimchk command node will be evaluated at run-time to determine if the dimension reference is within the valid range for this dimension of the array.

Once the dimchk command node has been inserted into the parse tree, program control will proceed to step 450 for a determination of whether there are additional dimensions of this array to be tested, in the manner described above. Once all of the array dimensions have been tested, program control will return to the read-time error checking process at step 320 (FIG. 3).

Figure 5A:
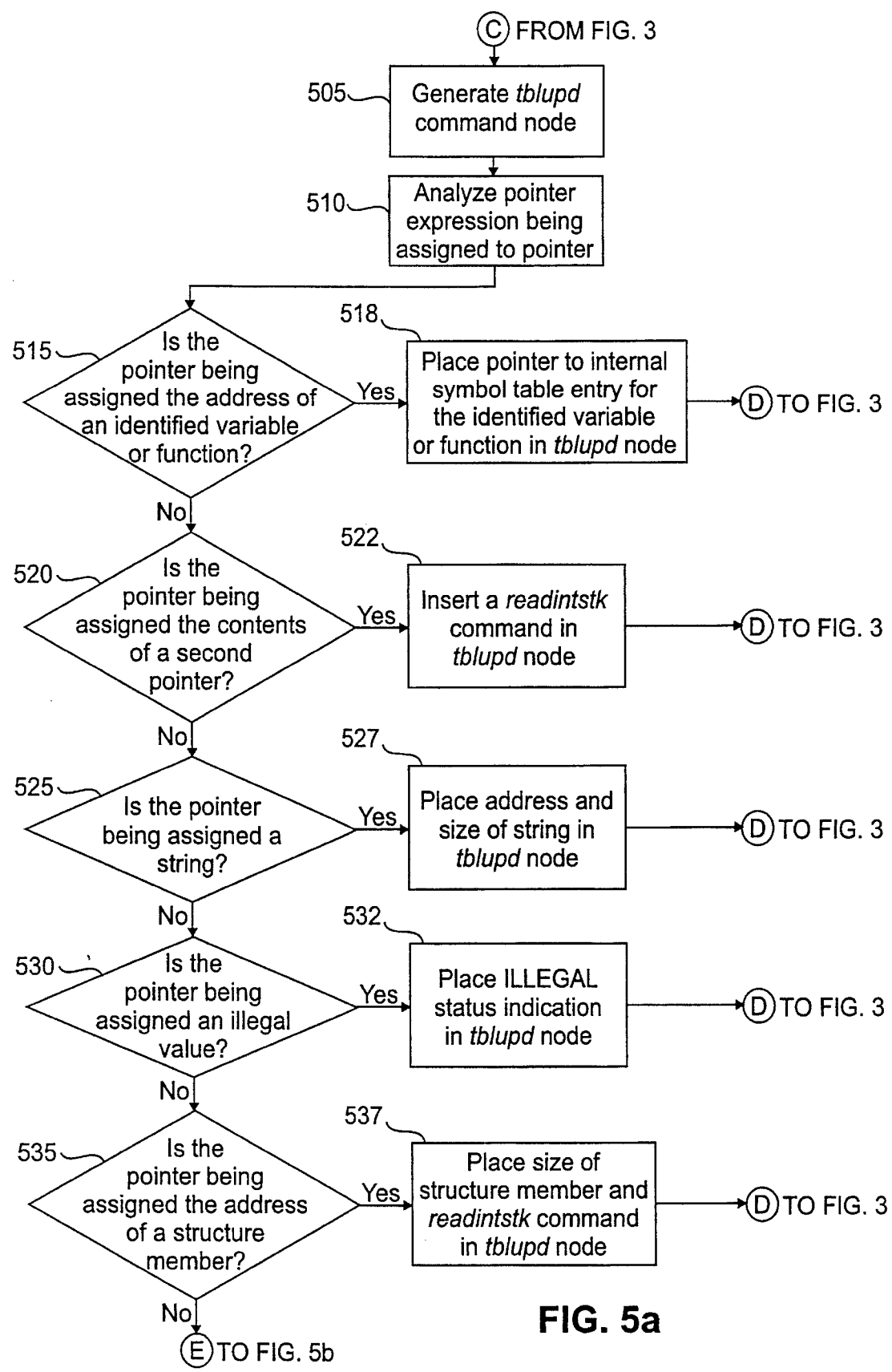
FIGS. 5a and 5b, collectively, are a flow chart describing an exemplary read-time pointer table updating subroutine as utilized by the error checking process of FIG. 3.
Figure 5B:
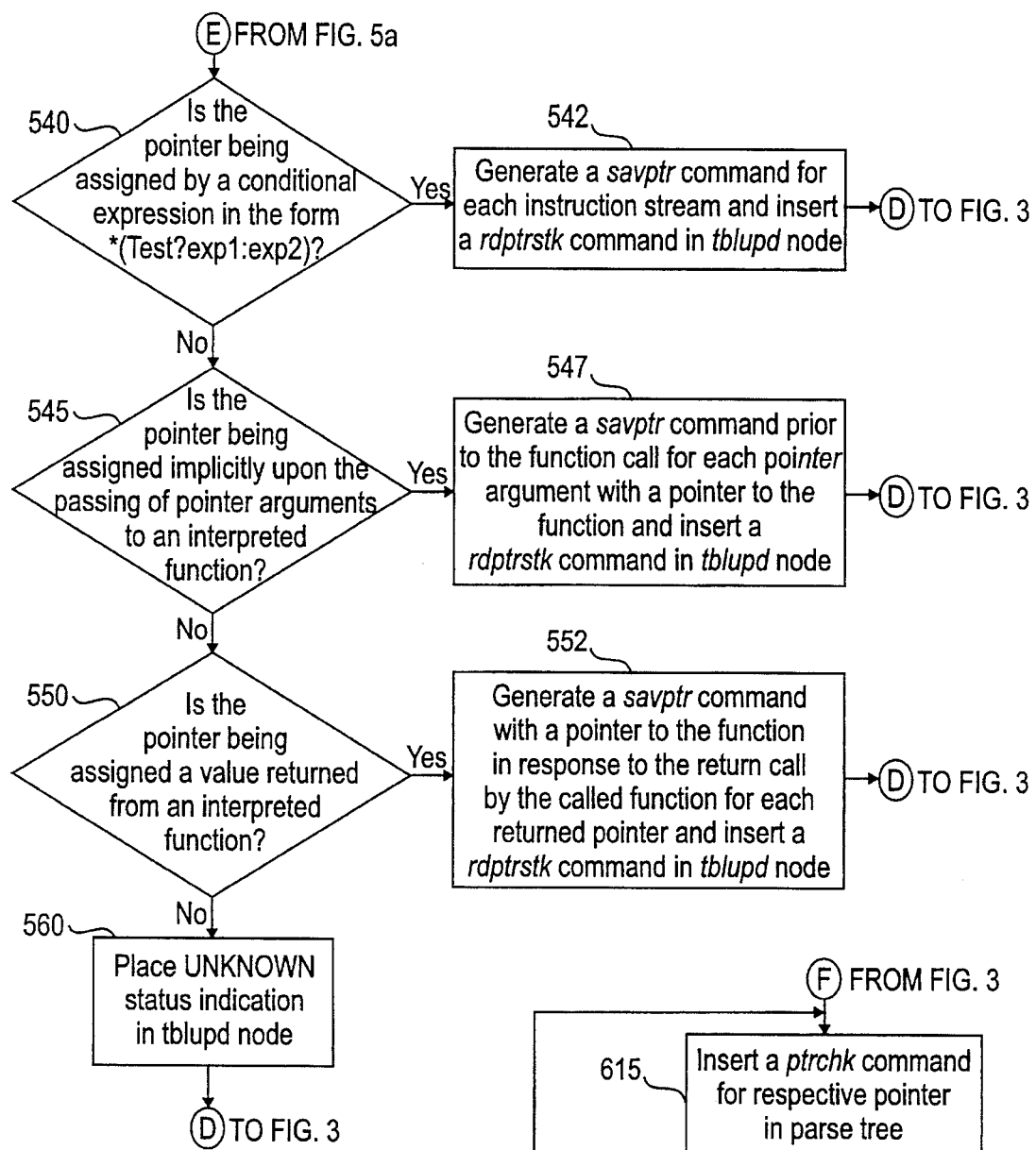

The read-time pointer table updating subroutine, illustrated in FIGS. 5a and 5b, will be entered at step 505 if the line of source code being evaluated by the read-time error checking process assigns a value to a pointer, as detected by the read-time error checking process during step 320 (FIG. 3). Each time a pointer is assigned a value, the read-time pointer table updating subroutine will insert the necessary commands and information into the parse tree so that the pointer check table 200 will be properly updated at run-time with the new information for the respective pointer.

Once the read-time pointer table updating subroutine is entered, a tblupd command node will be inserted in the parse tree during step 505, which when evaluated at run-time will initiate an update of the pointer check table 200. In order to facilitate the run-time table update, additional information that can be obtained at read-time, i.e., a characterization of the type of the pointer expression being assigned to the pointer, will be placed in the tblupd command node.

Thus, the pointer expression being assigned to the pointer is analyzed during step 510 and then tested against a number of conditions during steps 515 through 560, until a type match is obtained.

A test is performed during step 515 to determine if the pointer is being assigned the address of an identified variable or function. If it is determined during step 515 that the pointer is being assigned the address of an identified variable or function, a pointer to the appropriate entry in the internal symbol table 75 for the identified variable or function is placed in the tblupd node during step 518. At run-time, the entry in the internal symbol table 75 will be accessed to obtain the necessary pointer information. Thereafter, program control will return to the read-time error checking process at step 330 (FIG. 3).

If it is determined during step 515 (FIG. 5a) that the pointer is not being assigned the address of an identified variable or function, program control will proceed to step 520.

A test is performed during step 520 to determine if the pointer is being assigned the contents of a second pointer. If it is determined during step 520 that the pointer is being assigned the contents of a second pointer, program control will proceed to step 522. In this case, it is impossible to determine at read time what the second pointer will be pointing at during run-time and what the valid range of the second pointer will be.

At run-time, however, the address of the second pointer will be on the top of the interpreter stack 60. Thus, during step 522, a readintstk command is placed in the tblupd node, which when evaluated at run-time will cause the address of the second pointer to be retrieved from the interpreter stack 60 for further processing. Thereafter, program control will return to the read-time error checking process at step 330 (FIG. 3).

If it is determined during step 520 (FIG. 5a) that the pointer is not being assigned the contents of a second pointer, program control will proceed to step 525.

A test is performed during step 525 to determine if the pointer is being assigned a string. If it is determined during step 525 that the pointer is being assigned a string, the information which will be needed to populate the appropriate row of the pointer check table 200 for the pointer being assigned, i.e., the address and size of the string, are known at read-time. Thus, during step 527 the address and size of the string are place in the tblupd node. Thereafter, program control will return to the read-time error checking process at step 330 (FIG. 3).

If it is determined during step 525 (FIG. 5a) that the pointer is not being assigned a string, program control will proceed to step 530.

A test is performed during step 530 to determine if the pointer is being assigned an illegal value. If it is determined during step 530 that the pointer is being assigned an illegal value, i.e., a constant null or negative value, an indication of the ILLEGAL status is placed in the tblupd node during step 532. Since a pointer may permissibly store an illegal value, an error message is not generated here. However, as will be discussed further below, if the pointer is dereferenced at run-time while it still contains the illegal value, an error message will be generated at that time. Following execution of step 532, program control will return to the read-time error checking process at step 330 (FIG. 3).

If it is determined during step 530 (FIG. 5a) that the pointer is not being assigned an illegal value, program control will proceed to step 535.

A test is performed during step 535 to determine if the pointer is being assigned the address of a structure member. If it is determined during step 535 that the pointer is being assigned the address of a structure member, the size of the structure member will be known at read-time. However, the address of the structure member will remain unknown until run-time, at which time the address of the structure member will be at the top of the interpreter stack 60.

Thus, during step 537, the size of the structure member and a readintstk command are placed in the tblupd node.

When the readintstk command is evaluated at run-time, the address of the structure member will be retrieved from the interpreter stack 60. Following execution of step 537, program control will return to the read-time error checking process at step 330 (FIG. 3).

If it is determined during step 535 (FIG. 5a) that the pointer is not being assigned the address of a structure member, program control will proceed to step 540 (FIG. 5b).

A test is performed during step 540 to determine if the pointer is being assigned by a complex expression, e.g., p=*(test ? exp1: exp2), where exp1 and exp2 are pointer expressions that evaluate to the address of a pointer. This special test condition has been implemented in order to perform error checking on this common programming technique for implementing if, then, else routines. Since the indirection operator, *, will be performed on either exp1 or exp2, depending on whether the test condition is true or false, it is unknown at read-time which of the two expressions will determine the characteristics of the new pointer.

In a preferred embodiment, an instruction, such as a savptr command, is placed in each of the two instruction streams, only one of which is executed at run-time. The savptr command instructs the evaluator 35 to place the pointer information for the pointer associated with the executed instruction stream in the pointer save stack 65, for subsequent access by the evaluator 35. The pointer information retrieved from the pointer save stack 65 can then be retrieved by the evaluator 35 at run-time for placement in the pointer check table 200, in a manner described further below.

Thus, if it is determined during step 540 that the pointer is being assigned by a conditional expression in the form *(test ? exp1: exp2) then a savptr command is generated during step 542 for placement in each of the instruction streams associated with the two expressions, exp1 and exp2. In addition, a second instruction, such as a rdptrstk command, is placed in the tblupd node, which, when evaluated, will cause the evaluator 35 to retrieve the contents of the pointer save stack 65. Following execution of step 542, program control will return to the read-time error checking process at step 330 (FIG. 3).

If it is determined during step 540 (FIG. 5b) that the pointer is not being assigned by such a complex expression, program control will proceed to step 545.

A test is performed during step 545 to determine if the pointer is being assigned implicitly upon the passing of one or more pointer arguments to an interpreted function. When a program calls an interpreted function, the arguments of the called function, as set forth in the call statement, i.e., the actuals, are implicitly assigned to the respective automatic variables within the declared function, i.e., the formals.

When a function is called, the evaluator 35 pushes the arguments of the called function onto a stack frame within the hardware stack 67 that is allocated for the calling function. Thereafter, a new stack frame is created by the evaluator 35 for the called function by updating the stack frame pointer. It is noted that the stack frame utilized by the called function will have different stack addresses than the stack addresses of the calling function's stack frame.

The entries in the pointer check table 200 for the formal parameters that are pointers are preferably created by copying the entries in the pointer check table 200 for the actual pointer parameters that were passed into the function. Thus, it is preferred that the pointer information from the pointer check table 200 for the passed actual parameters that are pointers be placed in the pointer save stack 65. In this manner, the evaluator 35 can create the appropriate entries in the pointer check table 200 at run-time for the formal parameters that are pointers by copying the pointer information that has been placed in the pointer save stack 65.

Thus, if it is determined during step 545 that the pointer is being assigned implicitly upon the passing of pointer arguments to an interpreted function, program control will proceed to step 547. A savptr command will be placed in the parse tree prior to the function call for each pointer argument. In a preferred embodiment, the savptr command includes a pointer to the called interpreted function that will be receiving the passed pointer arguments. The pointer to the function will serve as an identifier to ensure the validity of the information that is placed in the pointer save stack 65. In addition, a rdptrstk command will be inserted into the tblupd node.

When the savptr commands are subsequently evaluated at run-time, the pointer information for the passed actual parameters that are pointers is placed in the pointer save stack 65. Thereafter, evaluation of the rdptrstk command at run-time will cause the evaluator 35 to retrieve the contents of the pointer save stack 65, for placement in the pointer check table 200. Following execution of step 547, program control will return to the read-time error checking process at step 330 (FIG. 3).

If it is determined during step 545 (FIG. 5b) that the pointer is not being assigned implicitly upon the passing of pointer arguments to an interpreted function, program control will proceed to step 550.

A test is performed during step 550 to determine if the pointer is being assigned a value returned from an interpreted function. Since little, if any, information will be known about the value to be returned from the function at read-time, instructions are placed in the parse tree which will push the pointer information for the returned pointers into the pointer save stack 65 at run-time. Thus, the evaluator 35 can subsequently retrieve the pointer information associated with the returned pointers from the pointer save stack 65 at run-time for placement in the pointer check table 200.

Thus, if it is determined during step 550 that the pointer is being assigned a value returned from a function, a savptr command is generated during step 552 for each returned pointer in response to the return call in the called function. In addition, a rdptrstk command is placed in the tblupd node. In a preferred embodiment, the savptr command includes a pointer to the interpreted function that is returning the pointer information. The pointer to the function will serve as an identifier to ensure the validity of the information that is placed in the pointer save stack 65. Thereafter, program control will return to the read-time error checking process at step 330 (FIG. 3).

When the savptr commands are subsequently evaluated at run-time, the pointer information associated with the pointers being returned from the function is placed in the pointer save stack 65. Thereafter, evaluation of the rdptrstk command at run-time will cause the evaluator 35 to retrieve the contents of the pointer save stack 65, for placement in the pointer check table 200.

It is noted that it is improper for a function to return pointers to automatic variables. Thus, an error should be generated in this event.

If it is determined during step 550 (FIG. 5b) that the pointer is not being assigned a value returned from a function, program control will proceed to step 560.

If program execution reaches step 560, the pointer expression being assigned to the pointer cannot be characterized according to one of the above-established tests. Thus, nothing can be ascertained at read-time about the pointer being assigned and an indication of the UNKNOWN status is placed in the tblupd node during step 560. Following the execution of step 560, program control will return to the read-time error checking process at step 330 (FIG. 3).

Figure 6:
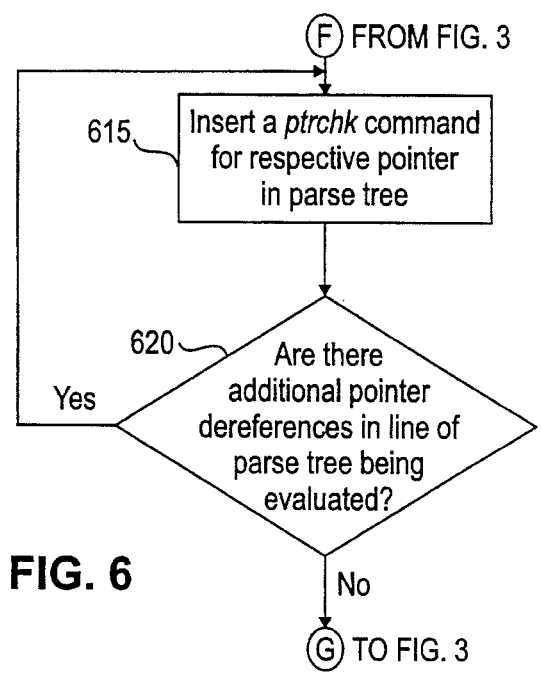
FIG. 6 is a flow chart describing an exemplary read-time pointer checking subroutine as utilized by the error checking process of FIG. 3.

The read-time pointer checking subroutine, illustrated in FIG. 6, will be entered at step 615 if the line of source code being evaluated by the read-time error checking process contains at least one dereferencing of a pointer, as detected during step 330 (FIG. 3). Each time a pointer is dereferenced, the read-time pointer checking subroutine will insert the necessary pointer checking commands into the parse tree so that the pointer check table 200 will be accessed at run-time to test the validity of the dereferenced pointer.

When the read-time pointer checking subroutine is entered at step 615, a ptrchk command node will be inserted for the pointer being dereferenced into the parse tree during step 615. Since the value of the pointer being dereferenced will be the top-most item on the interpreter stack 60 after the pointer value has been computed and before the computed value is utilized to address memory, the ptrchk command node should be placed just before the memory addressing instruction.

When the ptrchk command node is evaluated at run-time, the run-time pointer checking subroutine, discussed below relative to FIGS. 11a and 11b, will be initiated to determine if the value retrieved from the interpreter stack 60 is within the valid range of the pointer as indicated in the valid memory bounds entries 250a, 250b of the pointer check table 200 for the respective pointer.

A test is then performed during step 620 to determine if there are any additional pointer dereferences in the line of the parse tree being evaluated. If it is determined during step 620 that there are additional pointer dereferences in the line of the parse tree being evaluated, then program control will return to step 615 for further processing. Once it is determined during step 620 that all of the pointer dereferences in the line of the parse tree being evaluated have been processed, program control will return to the read-time error checking process at step 335 (FIG. 3).

A test is performed during step 335 to determine if the line of source code being evaluated by the read-time error checking process contains a call to a function. If it is determined during step 335 that the line of source code being evaluated does contain a call to a function, all of the memory that may be accessed by the function is identified during step 337, i.e., all global variables and all variables passed to the function. In addition, if the function does have access to any memory, an allocation access flag is set in the entry in the internal symbol table 75 corresponding to the compiled function. The setting of this allocation access flag will initiate an initialization bit vector maintenance subroutine each time the associated function is called at run-time, as discussed below relative to FIG. 12b.

If it is determined during step 335 that the line of source code being evaluated does not contain a call to a function, then program control will proceed to step 340.

During step 340, the read-time error checking process performs a test to determine if there are additional nodes of the parse tree which still need to be read and analyzed. If it is determined during step 340 that there are additional nodes of the parse tree to be analyzed, program control will return to step 300, and proceed in the manner described above. If, however, it is determined during step 340 that there are no remaining nodes of the parse tree to be analyzed, program control will proceed to step 350.

During step 350, a data flow analysis is performed by the memory error detection code inserter 25 on the modified parse tree, which includes the error checking commands and additional information that have been inserted into the parse tree. The data flow analysis minimizes the number of pointer checks that have to be performed at run-time by eliminating duplicative, i.e., overlapping, pointer checks from the parse tree and allows certain read-time errors to be detected. For a discussion of a suitable data flow analysis algorithm, see William Landi & Barbara G Ryder, "Aliasing With and Without Pointers: A Problem Taxonomy," Center for Computer Aids For Industrial Productivity, Technical Report CAIP-TR-125, Rutgers University, (Sep. 25, 1990); William Landi & Barbara G. Ryder, "A Safe Approximate Algorithm for Interprocedural Pointer Aliasing," SIGPLAN Notices, July 1992, pp. 235–248, each incorporated herein by reference.

The data flow analysis of an illustrative source code file, sample, shown in FIG. 14a, is briefly discussed below. The data flow analysis analyzes the modified parse tree and identifies each time a pointer is assigned a new value or is dereferenced. It is noted that a tblupd command node has previously been placed in the parse tree for each pointer assignment, and a ptrchk command node has previously been inserted in the parse tree each time a pointer has been dereferenced.

The source code, sample, illustrated in FIG. 14a, declares and initializes a pointer, ptr_part, that points to a structure, widget. The data flow analysis establishes a flow set for each pointer appearing in the source code being evaluated, such as the flow set illustrated in FIG. 14b for the pointer, ptr_part, created during execution of the source code, sample.

A new flow set will be established for a given pointer each time the associated pointer is assigned a new value. In a preferred embodiment, the flow set will be marked "DEF ILL", i.e., defined, each time the associated pointer is assigned a legal value, and will be marked "DEF ILL" each time the associated pointer is assigned an illegal value. Similarly, the flow set will be marked "USED" each time the associated pointer is dereferenced.

Lines 10 through 50 of the source code, sample, shown in FIG. 14a, declare a structure, widget. Line 60 declares a pointer, ptr_part, that points to the widget structure and line 70 initializes, i.e., defines, the pointer to point to the start of the widget structure. The data flow analysis of line 70 will cause the first flow set for the pointer, ptr_part, shown in FIG. 14b, to be marked "DEF", thereby indicating that the pointer has been assigned a non-zero value.

The pointer, ptr_part, is dereferenced in each of lines 80 through 100 in order to assign values to the three members of the widget structure. Thus, the data flow analysis of each of the lines 80 through 100 will cause the first flow set in FIG. 14b to be marked "USED", thereby indicating that the pointer has been dereferenced.

The pointer, ptr_part, is then assigned a new value in line 50, thereby causing a new flow set for ptr_part to be established. Thus, the data flow analysis of line 150 will cause the second flow set in FIG. 14b to be marked "DEF ILL," thereby indicating that the pointer has been assigned an illegal value.

The pointer, ptr_part, is then dereferenced in line 160 in order to assign a value to the number member of the widget structure. Thus, the data flow analysis of line 160 will cause the second flow set in FIG. 14b to be marked "USED", thereby indicating that the pointer has been dereferenced. As discussed below, the analysis of this second flow set will cause a read-time error to be generated, because an illegal pointer is being dereferenced at the time line 160 is executed.

Once the flow sets have been established for the entire parse tree, each flow set is analyzed in order to minimize the number of pointer checks that have to be performed at run-time. Since by definition, a given pointer will maintain the same value for the duration of each flow set, only one pointer check with an expanded offset to accommodate each individual pointer check needs to be performed for each set.

For example, the first flow set for the pointer, ptr__part, includes three dereferences of the pointer. Thus, while the pointer is storing the value assigned in line 70, it will be dereferenced three times. Normally, without using data flow analysis, three separate pointer checks would have to be performed. However, the data flow analysis will replace the three individual pointer checks in the parse tree with a single pointer check to test the validity of each of the three pointer dereferences.

A preferred embodiment of the invention provides a compiled code flow analysis routine to ensure the accuracy of the above data flow analysis where the flow set for a given pointer includes the calling of a compiled function among a series of pointer dereferences. If the compiled function has access to the pointer associated with the flow set, the compiled function could modify the value of the pointer without the interpreter 15 being aware.

Thus, if the compiled function has access to the pointer, the compiled code flow analysis routine preferably performs a test following execution of the compiled function at run-time to determine if the pointer value associated with the flow set has been modified during the execution of the compiled function. If the compiled function has modified the pointer value, an additional pointer check must be reexecuted for those pointer dereferences that occur in the flow set following the call to the compiled function. If the compiled function has not modified the pointer value, no additional pointer checks need be performed.

In addition to minimizing the number of pointer checks that have to be performed at run-time, the above-described data flow analysis allows certain errors to be detected at read-time. Thus, following completion of the data flow analysis in step 350, a test will be performed during step 360 to determine if the data flow analysis indicates that an uninitialized or illegal pointer is being dereferenced.

The memory error of dereferencing an uninitialized pointer occurs where a flow set indicates that a pointer is dereferenced before it has been assigned, i.e., if the flow set has been marked "USED" before it is marked "DEF". Similarly, the memory error of dereferencing an illegal pointer occurs where a flow set has been marked "DEF ILL" and is then marked "USED," without any intervening assignments, such as in the second flow set illustrated in FIG. 14b.

If it is determined during step 360 that an illegal or uninitialized pointer is being dereferenced, an error message is generated during step 370, before the process is exited at step 380.

If, however, it is determined during step 360 that an illegal or uninitialized pointer is not being dereferenced, the read-time error checking process will be exited at step 380.

Upon completion of the read-time error checking process and associated subroutines, discussed above relative to FIGS. 3 through 6, each line of the parse tree has been analyzed and the appropriate error checking commands and information have been inserted into the parse tree. The inserted error checking commands and additional information will be evaluated at run-time to initiate and facilitate run-time error checking.

ERROR CHECKING OF COMPILED OBJECT CODE

According to another feature of the invention, it is also desired to perform similar error checking on compiled object code that will be executed at run-time by the evaluator 35. In a preferred embodiment, error checking of the compiled object code is implemented by running interpreted wrapper functions, described below, before and/or after the run-time execution of associated compiled functions, as necessary, to simulate the error checking processes that were performed on the interpreted source code at read-time.

Preferably, wrapper functions are provided, as necessary, for all compiled library functions. In addition, wrapper functions can be created for any user-defined compiled functions that require the monitoring and/or evaluation of pointer values, in accordance with the teachings herein. The manner in which wrapper functions are executed upon the calling of an associated compiled function at run-time is discussed below, relative to FIG. 12a.

A wrapper library 70, accessible by the evaluator 35, is preferably provided, as shown in FIG. 1. The wrapper library 70 preferably maintains a pre-execution wrapper function for each compiled function that dereferences a pointer during the execution of the compiled code. The pre-execution wrapper function should initiate a pointer check of any pointer that will be dereferenced during execution of the compiled code, in the same manner that pointer checks are implemented for dereferencing of pointers in interpreted functions.

The pre-execution wrapper function is preferably executed just prior to the execution of the associated compiled function, thereby ensuring that the pointer is not dereferenced unless it points to a valid value. The pre-execution wrapper function for a given function preferably also performs array dimension checking, as discussed herein, on any passed arguments that include array references. Similarly, if an argument passed to a given compiled function has pre-defined valid ranges, the associated pre-execution wrapper function can test the validity of the passed arguments against the known ranges.

It is noted that for certain compiled functions, the associated pre-execution wrapper function may need to store a pointer argument or other information that is passed to the compiled function on the first execution of the compiled function, as subsequent calls to the same function may only pass a code indicating that the same information from the previous execution should be utilized.

In addition, the wrapper library 70 preferably maintains a post-execution wrapper function for each compiled function that creates a pointer during the execution of the compiled code, as well as for each compiled function that returns a value that is subsequently assigned to a pointer upon return to the calling function. The post-execution wrapper functions are preferably executed after the compiled function returns, but before the calling function resumes execution.

If a compiled function creates a pointer during execution, the post-execution wrapper function should add the pointer information for the created pointer to the pointer check table 200, in the same manner as table entries are updated for pointers created by interpreted code.

Similarly, if the compiled function returns a value to the calling function that will be subsequently assigned to a pointer in the calling function, the appropriate pointer information must be added to the pointer check table 200. In this instance, the pointer information for the value being returned must be placed in the pointer save stack 65, in the same manner as the read-time pointer table updating subroutine handled values being returned from interpreted functions during step 552 (FIG. 5b). Thereafter, the information may be retrieved from the pointer save stack 65 by the evaluator 35, for placement in the pointer check table 200.

For example, pointers are frequently assigned values that are returned from compiled memory allocation functions, such as the malloc function commonly found in function libraries of the C programming language. The post-execution wrapper function for the malloc function will preferably place the starting address of the allocated region and the valid range of the region, which may be derived from the starting address and size information, in the pointer save stack 65. In this manner, when a pointer in the calling function is then assigned the return value, the appropriate row in the pointer check table 200 may be updated with the relevant pointer information. The starting address is placed in the contents of pointer entry 240 and the valid range entry 250 is populated with the range information calculated by the post-execution wrapper function. Preferably, an ALLOCATED status indication is placed in the status entry 260.

According to a preferred embodiment of the invention, however, additional pointer information will be maintained for pointers that point to allocated memory space. When lines 200 and 210 of the illustrative source code testfile, shown in FIG. 2b, are executed, it will result in a block of 35 bytes being allocated, with the starting address of the allocated block being assigned to the pointer ptr_alloc. Upon returning from the malloc function, the row in the pointer check table 200 for the pointer ptr_alloc will be updated to reflect the new pointer information. The pointer address entry 230 and the contents of pointer entry 240 will be populated with the appropriate information. The status entry 260 will be populated to indicate that the pointer points to ALLOCATED memory space.

Figure 2E:
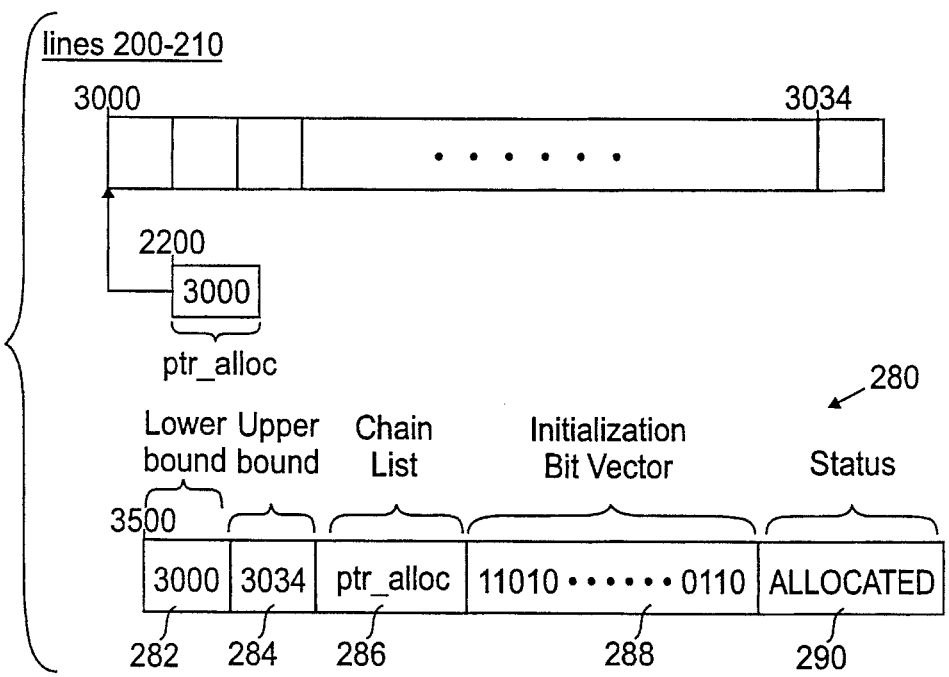
FIG. 2e illustrates the relationship between a pointer, ptr_alloc, and a block of allocated memory pointed to by the pointer, following execution of lines 200 through 210 of the source code of FIG. 2b, as well as an associated memory allocation structure that maintains additional information on the block of allocated memory.

In the preferred embodiment, the post-execution wrapper function for the malloc function will also create a memory allocation structure 280, as illustrated in FIG. 2e. As shown in FIG. 2a, the lower memory bound entry 250a for the pointer ptr_alloc will include a pointer to the memory allocation structure 280.

The memory allocation structure 280 will include a lower bound member 282, an upper bound member 284, a chain list member 286, an initialization bit vector 288 and a status member 290. The valid lower and upper bounds of the allocation are stored in members 282 and 284, respectively.

The chain list member 286 includes a list of all pointers that currently point to the associated block of allocated memory. Each time a pointer to allocated memory is copied to another pointer, the status entry 260 in the pointer check table 200 for the second pointer will also be marked as ALLOCATED, and will contain a pointer to the same memory allocation structure 280 in the valid lower memory bound entry 250a. In addition, the new pointer is added to the list in the chain list member 286.

Similarly, if a pointer that points to allocated memory is reassigned to point at a new block of allocated memory, the pointer is preferably removed from the list in the chain list member 286 for the previous allocation, before being added to the chain list member 286 for the new allocation. As discussed further below, this feature of the invention allows memory leaks to be detected automatically.

Accordingly, the information recorded in the chain list member 286 of the memory allocation structure 280 indicates only those pointers that currently point to the associated allocated memory.

The initialization bit vector 288 contained in the memory allocation structure 280, as shown in FIG. 2e, consists of a bit for each byte of allocated memory and maintains the initialization status of each byte of the associated memory. In a preferred embodiment, when every byte in the region of allocated memory has been initialized, the initialization bit vector 288 is discarded and a flag is set to indicate the initialized status of the entire region. As discussed further below, each time a pointer is used to read allocated memory, the initialization bit vector 288 is evaluated to ensure that the respective bytes of allocated memory have been initialized. In addition, as discussed further below, a mechanism is provided for updating the appropriate bits of the initialization bit vector 288 upon detection of an initialization of allocated memory by either compiled or interpreted code.

In a preferred embodiment, the post-execution wrapper function associated with memory allocation functions, such as malloc, preferably pre-marks each four byte region of the memory that has been allocated by the function with a known pre-defined value that is unlikely to be encountered in most programming applications. This pre-marked value facilitates the detection of the initialization of the memory region.

It has been found that the hexadecimal value FFFA 5A5A will not normally be encountered in a programming environment for two reasons. First, if this value is used as a floating point value, a floating point trap error will be generated because the value is defined as not a number (NAN) in the Institute for Electrical and Electronic Engineers (IEEE) floating point standard. Second, if a programmer attempted to use this value as a pointer, segmentation or memory fault errors would be generated on most machines.

In addition to pre-marking all dynamically allocated memory with the hexadecimal value FFFA 5A5A, it is also preferred that the memory locations associated with all uninitialized automatic variables are similarly marked at run-time. In addition, it is noted that all uninitalized static variables are set to 0 at run-time by the linker 40.

Due to the slow operating speeds normally associated with memory allocation functions, such as malloc, many programmers will often allocate one large block of memory, and then break the large block into smaller pieces, as needed, with each smaller piece of allocated memory being accessible by at least one pointer. However, according to the pointer table updating processes outlined above, the valid range for each pointer would normally be recorded in the pointer check table 200 as the entire large block of memory.

Thus, the pointer check table 200 should indicate that the proper range for a pointer that is intended to point to only a smaller piece of the larger allocation. Accordingly, a user can preferably access the entries in the pointer check table 200 in order to record the smaller range.

Figure 7:
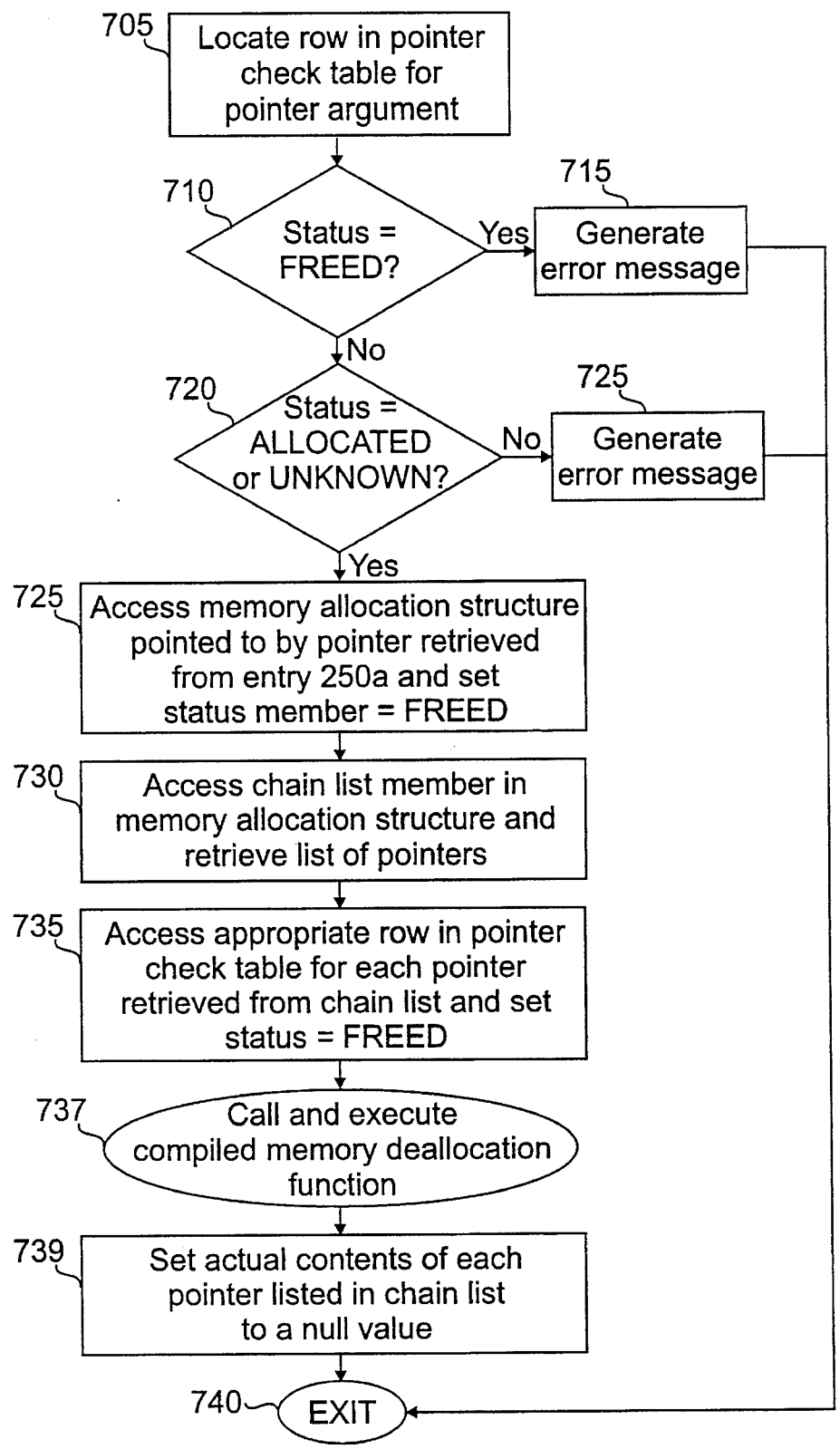
FIG. 7 is a flow chart describing an exemplary memory deallocation monitoring subroutine as utilized by an evaluator while executing a compiled memory deallocation function.

According to a further feature of the invention, the deallocation of allocated memory, i.e., by calling the free library function, is also monitored by a memory deallocation monitoring subroutine illustrated in FIG. 7. When a call is made to a memory deallocation function, the argument of the deallocation function is typically one of the pointers that point to the allocated memory space. A common programming error is to deallocate memory using one pointer, and then attempt to access the same memory space with a separate pointer that had been defined to point to the same space.

A pre-execution wrapper function is preferably initiated during steps 705 through 735 of the memory deallocation monitoring subroutine before the associated compiled memory deallocation function is called and executed during step 737. The pre-execution wrapper function will prevent subsequent errors from being encountered when attempting to access freed memory. The memory deallocation monitoring subroutine will initially locate the row in the pointer check table 200 during step 705 for the pointer argument that was passed to the deallocation function.

A test is performed during step 710 to determine if the status entry 260 indicates that the pointer has a FREED status. If it is determined during step 710 that the status is FREED, an error is generated during step 715 because the allocated memory that was pointed to by the pointer has already been freed. Thereafter, the subroutine is exited at step 740.

A test is performed during step 720 by the memory deallocation monitoring subroutine to determine if the status entry 260 has an ALLOCATED or UNKNOWN status. If it is determined during step 720 that the status is not ALLOCATED or UNKNOWN, an error message is generated during step 725 because these are the only valid status codes for allocated memory. Thereafter, the subroutine is exited at step 740.

If it is determined during step 720 that the status is ALLOCATED or UNKNOWN, the memory deallocation monitoring subroutine will access the memory allocation structure 280 pointed to by the pointer in the lower bound entry 250a during step 725 and set the status member 290 to indicate a status of FREED.

Thereafter, during step 730, the memory deallocation monitoring subroutine will access the chain list member 286 in the memory allocation structure 280, shown in FIG. 2e, and retrieve the list of all the pointers that point to the allocated space.

The appropriate row in the pointer check table 200 will be accessed during step 735 for each pointer indicated in the list retrieved during the previous step to mark their status entry 260 as FREED.

In addition, following execution of the compiled memory deallocation function during step 737, a post-execution wrapper function preferably sets the actual contents of each listed pointer to a null value during step 739. In this manner, if a subsequent attempt is made to dereference one of these pointers having a null value, an error will be generated. Thereafter, the subroutine is exited at step 740.

It is noted that an implicit memory deallocation occurs when static pointers point to memory space created for a local variable in an interpreted function. When the interpreted function returns, the allocated space will be automatically deallocated by the interpreter 15. Thus, since the static pointer points to invalid memory space following return from the function, it is preferred that the value of the static pointer be set to null and that the row in the pointer check table 200 for the static pointer is preferably updated to indicate a contents of 0. This may be implemented by executing the memory deallocation monitoring subroutine of FIG. 7 upon returning from an interpreted function that assigned the address of local variable to a static pointer.

RUN-TIME ERROR CHECKING OPERATIONS

Figure 8:
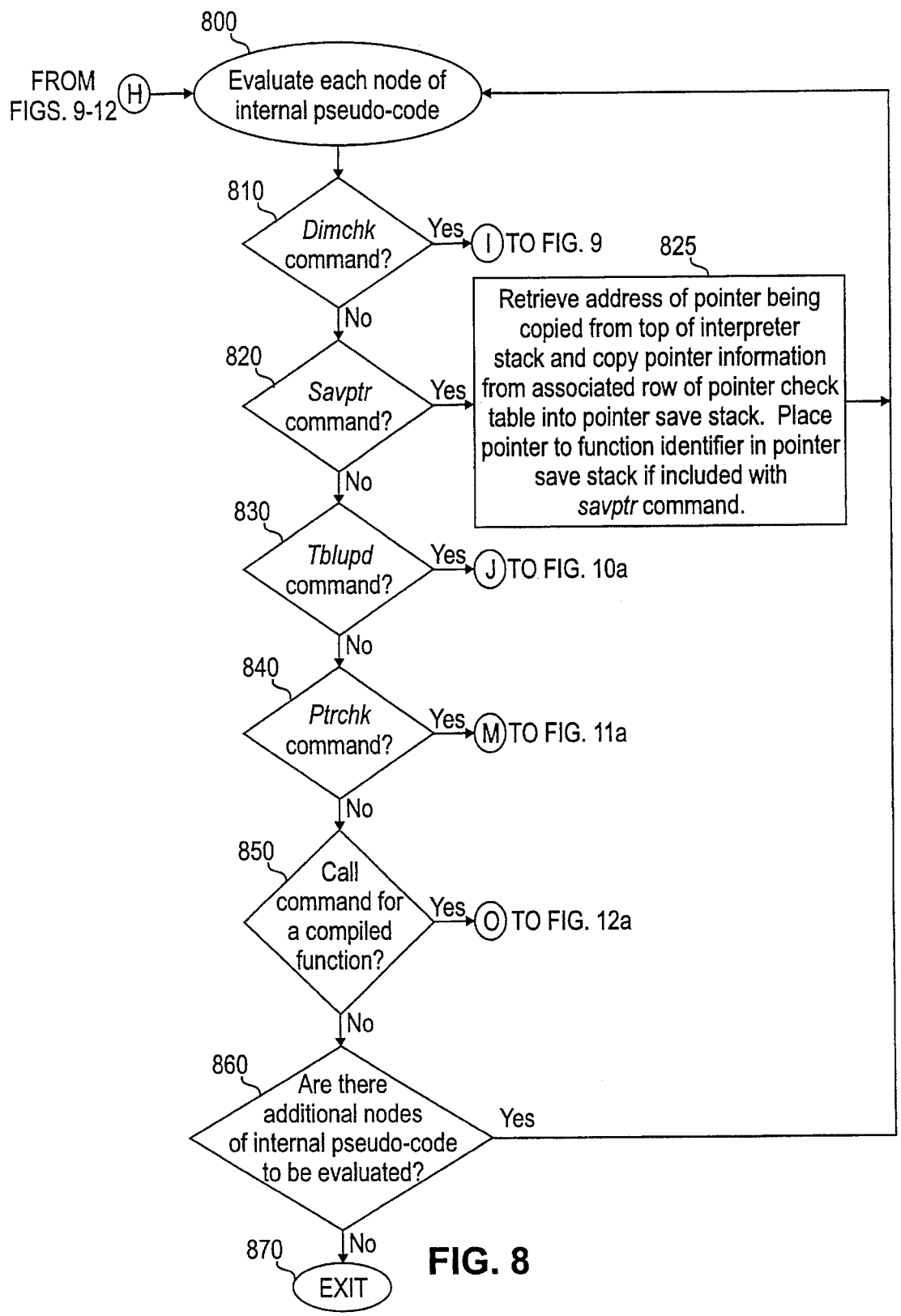
FIG. 8 is a flow chart describing an exemplary run-time error checking process as utilized by an evaluator while analyzing nodes of internal pseudo-code at run-time.

As the evaluator 35 evaluates each node of the internal pseudo-code at run-time, it implements a run-time error checking process, illustrated in FIG. 8, to determine if the node contains a command that will implicate an error checking routine. The run-time error checking process evaluates each node of the internal pseudo-code and implements run-time error checking tasks in response to certain error checking commands and additional information that were inserted into the parse tree by the read-time error checking process, discussed above relative to FIG. 3.

The run-time error checking process determines if the node being evaluated includes one of five commands that implicate run-time error checking routines, as illustrated in FIG. 8. If an error checking command is detected, the run-time error checking process will initiate the appropriate response, as shown in FIG. 8.

Figure 9:
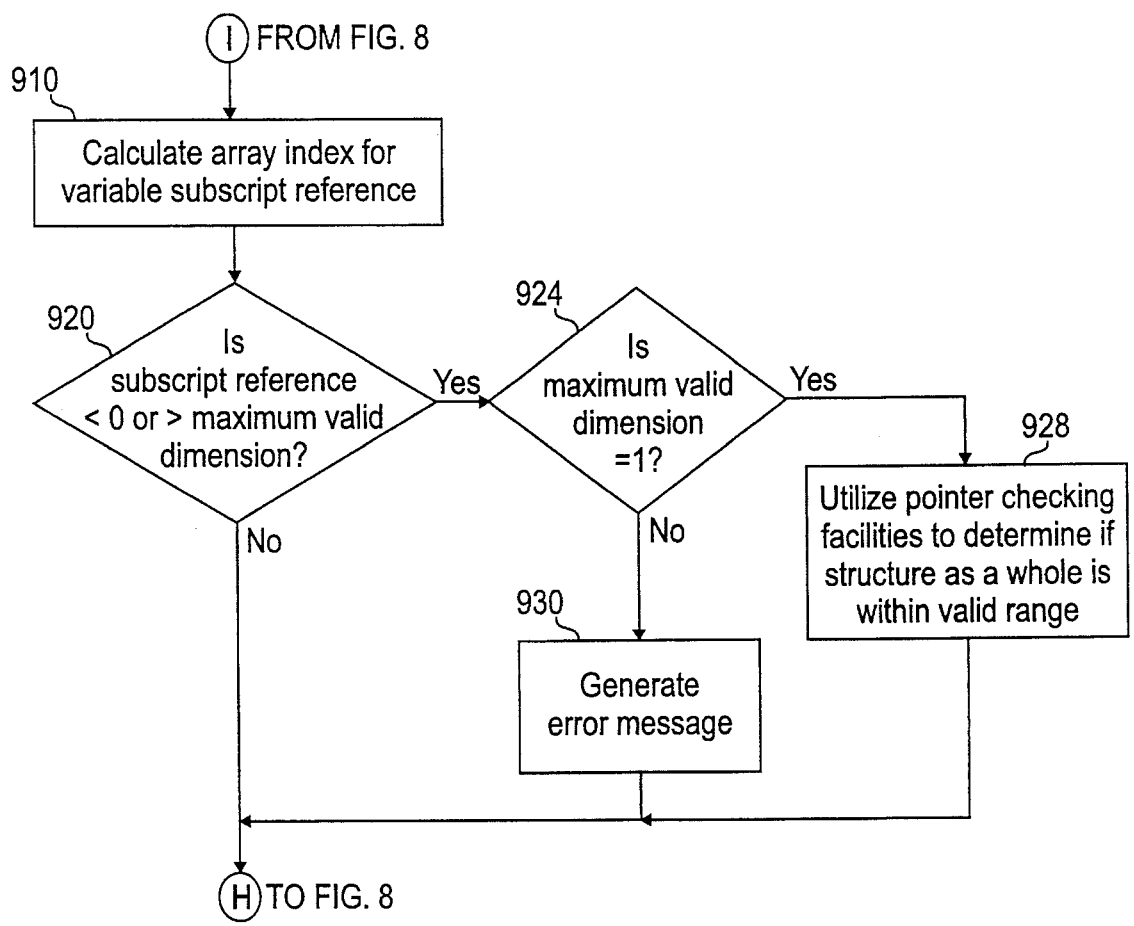
FIG. 9 is a flow chart describing an exemplary run-time array dimension checking subroutine as utilized by the error checking process of FIG. 8.

After entering the run-time error checking process at step 800, wherein each node of the internal pseudo-code is evaluated, a run-time array dimension checking subroutine, discussed below relative to FIG. 9, will be executed if a dimchk command is encountered, as detected during step 810.

The run-time array dimension checking subroutine will determine if an array is being referenced at run-time with an illegal subscript. During step 910, the variable array subscript is calculated, based on run-time conditions. Thereafter, during step 920, a test is performed to determine if the calculated subscript reference is negative or exceeds the valid maximum dimension. It is noted that the valid maximum dimension was calculated at read-time and included with the dimchk command.

If it is determined during step 920 that the calculated subscript reference is an illegal value, a test is performed during step 924 to determine if the maximum valid dimension is 1. If it is determined during step 924 that the maximum valid dimension is 1, the pointer checking facilities disclosed herein are utilized during step 928 to determine if the structure as a whole is within the valid range. The test performed during step 924 facilitates a common programming technique of ending a structure declaration with an array having a single element and then dynamically choosing how long the array will be at run-time. It is noted that when the structure is allocated, additional space is allocated for additional members of the array.

If it is determined during step 924 that the maximum valid dimension is not 1, the error is not the result of this common programming technique, and an error message is generated during step 930. Following execution of step 930, or if it is determined during step 920 that the calculated subscript reference is a legal value, process control returns to the run-time error checking process at step 800 (FIG. 8).

The run-time error checking process will perform a test at step 820 to determine if the node of internal pseudo-code being evaluated includes a savptr command. As discussed above, savptr commands have been inserted into the interpreted source code, such that when evaluated at run-time, each savptr command will cause the pointer information from the appropriate row in the pointer check table 200 to be copied into the pointer save stack 65.

Thus, if it is determined during step 820 that the node includes a savptr command, the evaluator 35 will retrieve the address of the pointer being copied from the top of the interpreter stack 60 during step 825. Thereafter, the evaluator 35 will locate the appropriate row of the pointer check table 200 using the address retrieved from the interpreter stack 60 and copy the pointer information from the row of the pointer check table 200 into the pointer save stack 65. In addition, if the savptr command includes a pointer to a function, as discussed above, the pointer to the function is also placed in the pointer save stack 65.

Figure 10A:
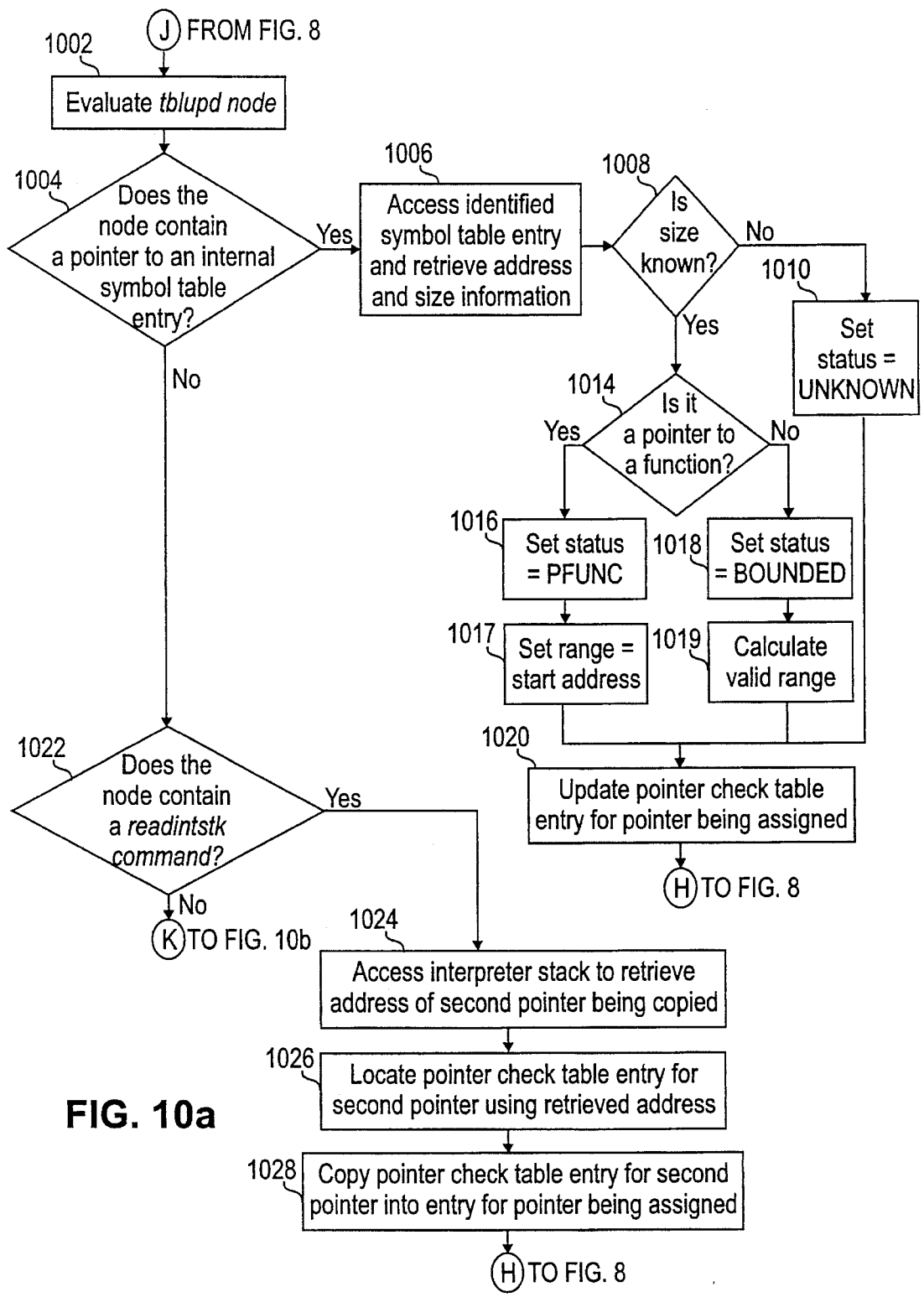
FIGS. 10a through 10c, collectively, are a flow chart describing an exemplary run-time pointer table updating subroutine as utilized by the error checking process of FIG. 8.
Figure 10B:
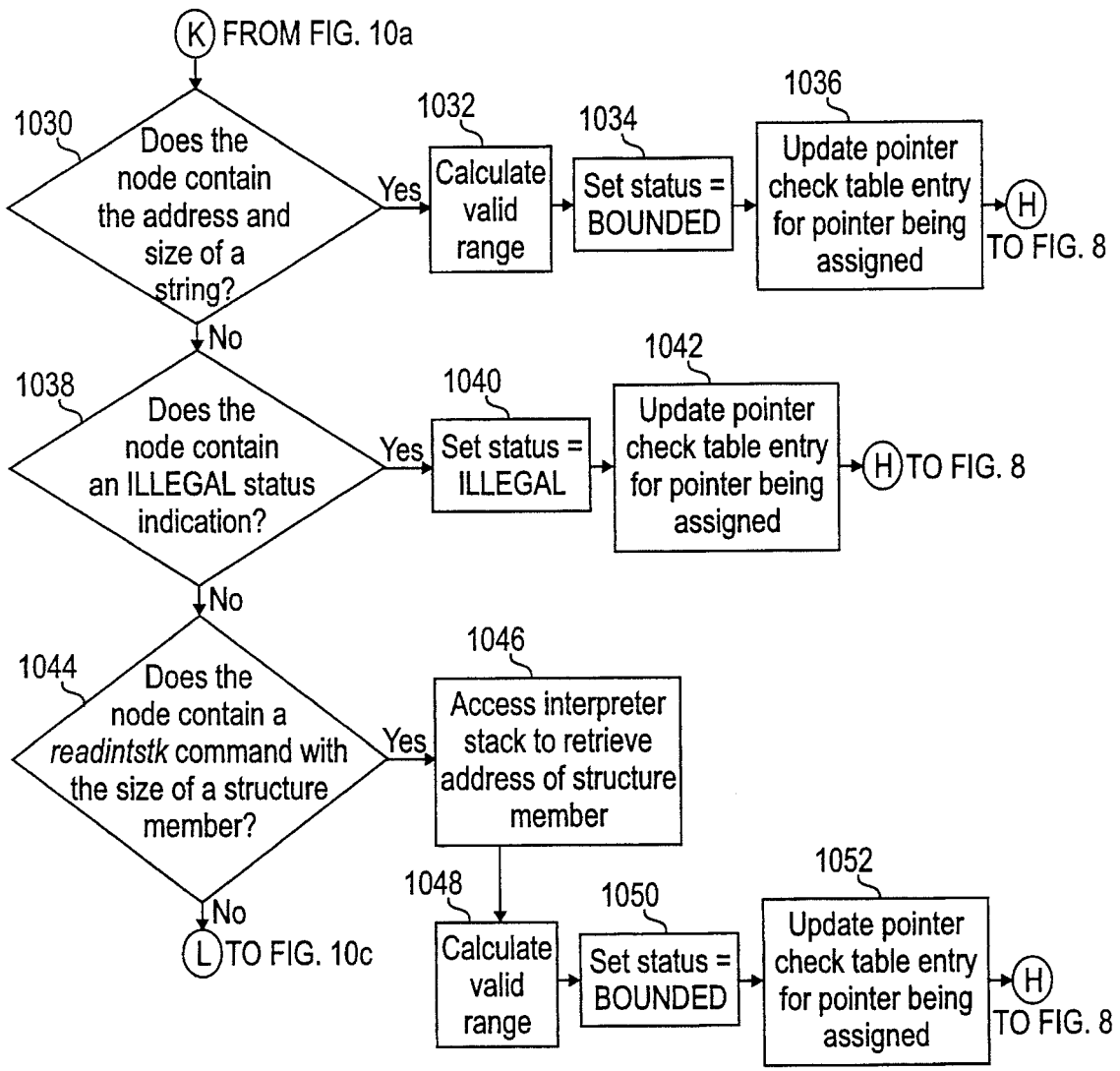
Figure 10C:
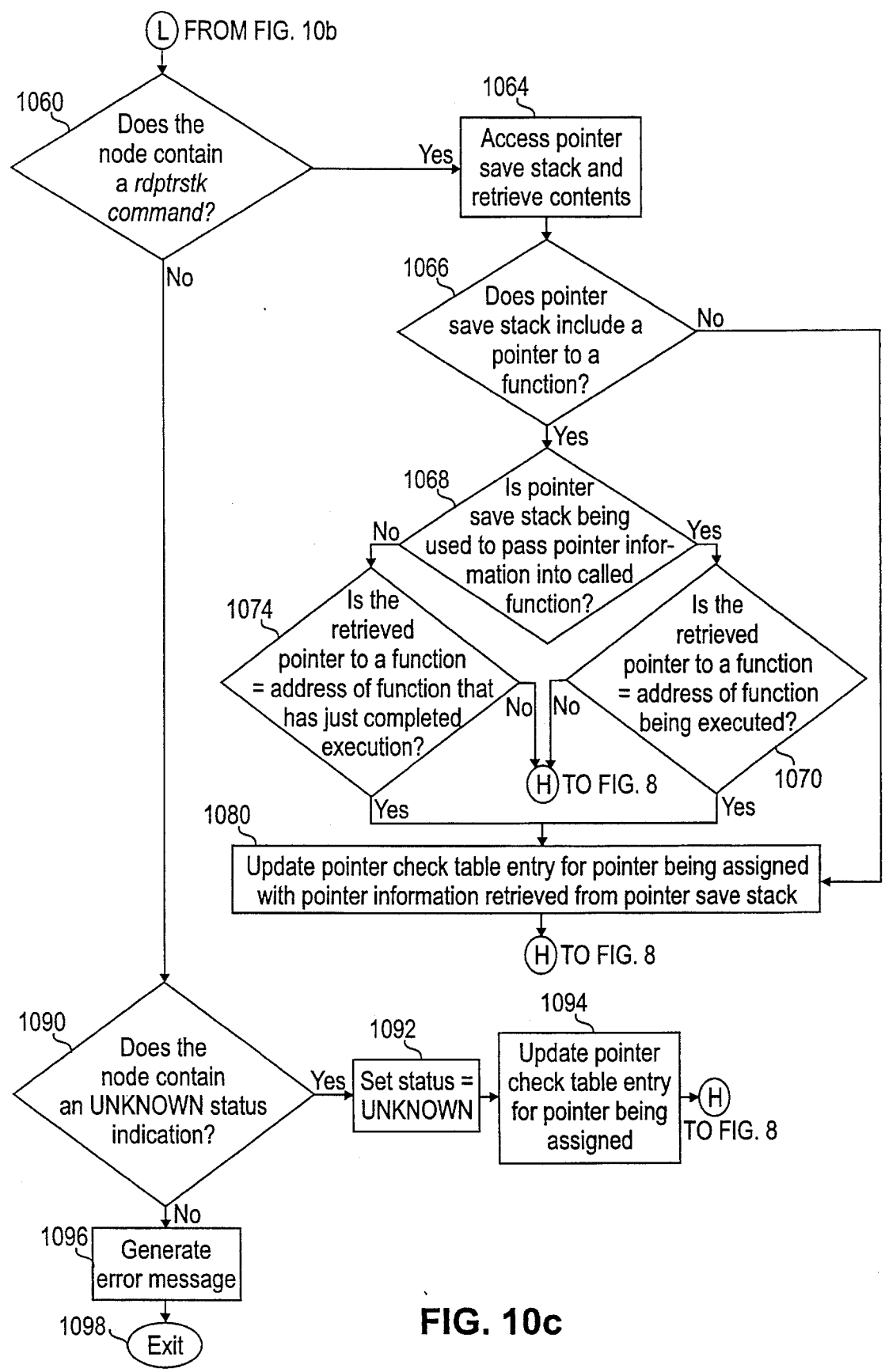

As discussed above, the pointer information may be subsequently retrieved from the pointer save stack 65 by the evaluator 35 for placement in the pointer check table 200 during steps 1060 through 1080 of the run-time pointer table updating subroutine, as shown in FIG. 10c and discussed below. Following execution of step 825, program control returns to step 800, and proceeds in the manner described above.

The run-time pointer table updating subroutine, illustrated in FIGS. 10a through 10c, will be entered at step 1002 if the node of internal pseudo-code being evaluated by the run-time error checking process includes a tblupd command, as detected during step 830 (FIG. 8).

The characteristic information included in the node of the tblupd command is evaluated in step 1002 (FIG. 10a), and then tested against a number of test conditions during steps 1004 through 1090, until a match is obtained. It is noted that the address of the pointer being assigned is obtained from the interpreter stack 60 at run-time. It is the address of the pointer that is utilized to locate and identify the appropriate row in the pointer check table 200 that should be updated with the pointer information for the pointer being assigned.

A test is performed during step 1004 to determine if the node contains a pointer to an entry in the internal symbol table 75, i.e., where the pointer is being assigned the address of an identified variable or function. If it is determined during step 1004 that the node does contain a pointer to an entry in the internal symbol table 75, the pointer will be utilized to access the appropriate entry of the internal symbol table 75 during step 1006 to retrieve the address of the identified variable or function, as well as the size of the identified variable or function, if available.

During step 1008, a test is performed to determine if the size information was available in the internal symbol table 75. If it is determined during step 1008 that the size information is not available in the internal symbol table 75, the status flag will be set to UNKNOWN during step 1010.

If it is determined that the size information is available in the internal symbol table 75, a test is performed during step 1014 to determine if the pointer is pointing to a variable or a function. If it is determined during step 1014 that the pointer is pointing to a function, the status flag will be set to PFUNC during step 1016. Since the valid range for a pointer to a function is only the start address of the function, because a function may only be initiated from the beginning, then the valid range is set during step 1017 to the starting address retrieved from the internal symbol table during step 1006.

If it is determined during step 1014 that the pointer is pointing to a variable, the status flag will be set to BOUNDED during step 1018. The valid range for the pointer will be calculated during step 1019, using the address and size information retrieved from the internal symbol table 75. During step 1020 the information that has been defined for the pointer being assigned during the execution of steps 1006 through 1019 is added to the appropriate row of the pointer check table 200 that has been established for the pointer being assigned. Thereafter, program control will return to the run-time error checking process at step 800 (FIG. 8).

If it is determined during step 1004 (FIG. 10a) that the node does not contain a pointer to an entry in the internal symbol table 75, program control will proceed to step 1022.

A test is performed during step 1022 to determine if the node contains only a readintstk command, which will have been placed in the parse tree at read-time if the pointer is being assigned the contents of a second pointer. If it is determined during step 1022 that the node does contain only a readintstk command, the evaluator 35 will preferably access the interpreter stack 60 to retrieve the address of the second pointer being copied. Thereafter, during step 1026, the evaluator 35 will utilize the address retrieved from the interpreter stack 60 during step 1024 to locate the row in the pointer check table 200 for the second pointer. The information that is retrieved from the pointer check table 200 for the second pointer is then copied into the row for the pointer being assigned. Thereafter, program control will return to the run-time error checking process at step 800 (FIG. 8).

If it is determined during step 1022 (FIG. 10a) that the node does not contain a readintstk command, program control will proceed to step 1030 (FIG. 10b).

A test is performed during step 1030 to determine if the node contains the address and size of a string which is being assigned to the pointer. If it is determined during step 1030 that the node does contain the address and size of the string, the evaluator 35 will calculate the valid range for the pointer during step 1032, based on the address and size information. After setting the status flag to BOUNDED during step 1034, the information that has been defined for the pointer being assigned during the execution of steps 1032 and 1034 is entered during step 1036 into the appropriate row of the pointer check table 200 for the pointer being assigned. Thereafter, program control will return to the run-time error checking process at step 800 (FIG. 8).

If it is determined during step 1030 (FIG. 10b) that the node does not contain the address and size of a string, program control will proceed to step 1038.

A test is performed during step 1038 to determine if the node contains an ILLEGAL status indication because the pointer is being assigned an illegal value. If it is determined during step 1038 that the node does contain an ILLEGAL status indication, the status flag is set to ILLEGAL during step 1040. The information that has been defined for the pointer is added to the appropriate row of the pointer check table 200 during step 1042. Thereafter, program control will return to the run-time error checking process at step 800 (FIG. 8).

If it is determined during step 1038 (FIG. 10b) that the node does not contain an ILLEGAL status indication, program control will proceed to step 1044.

A test is performed during step 1044 to determine if the node contains a readintstk command, together with the size of a structure member. If it is determined during step 1044 that the node does contain a readintstk command together with the size of the structure member, the evaluator 35 will retrieve the address of the structure member being assigned during step 1046. It is noted that the readintstk command has been positioned in the interpreted source code during read-time such that it will be evaluated at a time when the address of the structure member will be at the top of the interpreter stack 60.

The evaluator 35 will calculate the valid range for the pointer during step 1048, based on the size and retrieved address information, and then set the status flag to BOUNDED during step 1050. The information that has been defined for the pointer being assigned is added during step 1052 to the appropriate row of the pointer check table 200. Thereafter, program control will return to the run-time error checking process at step 800 (FIG. 8).

If it is determined during step 1044 (FIG. 10b) that the node does not contain a readintstk command together with the size of the structure member, program control will proceed to step 1060 (FIG. 10c).

A test is performed during step 1060 to determine if the node contains a rdptrstk command. If it is determined during step 1060 that the node contains a rdptrstk command, the evaluator 35 will retrieve the contents of the pointer save stack 65 during step 1064. As discussed above, whenever a rdptrstk command is detected, an associated savptr command will have already been evaluated during step 825 (FIG. 8), which placed the appropriate pointer information that is needed to update the pointer check table 200 in the pointer save stack 65.

A test is performed during step 1066 to determine if the pointer save stack 65 includes a pointer to a function. This test is implemented to allow the performance of error checking tasks on software programs that consist of interpreted source code and compiled library functions. It is noted that a pointer to a function is included with the savptr command at read-time if the pointer save stack 65 is being utilized to pass pointer information into a called function, i.e., during steps 545 and 547, or to return pointer information from a called function, i.e., during steps 550 and 552. The pointer to the function identifies the function that should receive the pointer information from the pointer save stack 65 in the case of passing pointer information to a called function, or identifies the function that has placed the pointer information in the pointer save stack 65 in the case of returning pointer information to the calling function.

If it is determined during step 1066 that the pointer save stack 65 does not include a pointer to a function, the validity of the pointer information in the pointer save stack 65 need not be tested and program control will proceed to step 1080, described below.

If it is determined during step 1066 that the pointer save stack 65 does include a pointer to a function, the validity of the pointer to the function must be tested. A test is performed during step 1068 to determine if the pointer save stack 65 is being utilized to pass pointer information into a called function or to return pointer information from a called function.

If it is determined during step 1068 that the pointer save stack 65 is being utilized to pass pointer information into the called function, a test is performed during step 1070 to ensure that the passed pointer information has been placed into the pointer save stack 65 by the calling function for retrieval by the called function by determining if the retrieved pointer to the function equals the address of the function currently being executed. If it is determined during step 1070 that the retrieved pointer to the function does not equal the address of the function currently being executed, then the pointer information from the pointer save stack 65 should not be placed in the pointer check table 200, and program control should return to the run-time error checking process at step 800 (FIG. 8).

If it is determined during step 1070 that the retrieved pointer to the function does equal the address of the function currently being executed, then the pointer information from the pointer save stack 65 should be placed in the pointer check table 200 during step 1080. Thereafter, program control should return to the run-time error checking process at step 800 (FIG. 8).

If it is determined during step 1068 that the pointer save stack 65 is being utilized to return pointer information to the calling function, a test is performed during step 1074 to ensure the pointer information has been placed into the pointer save stack 65 by the called function for retrieval by the calling function by determining if the retrieved pointer to the function equals the address of the function that has just completed execution, i.e., the address of the called function.

If it is determined during step 1074 that the retrieved pointer to the function does not equal the address of the function that has just completed execution, then the pointer information from the pointer save stack 65 should not be placed in the pointer check table 200, and program control should return to the run-time error checking process at step 800 (FIG. 8).

If it is determined during step 1074 that the retrieved pointer to the function does equal the address of the function that has just completed execution, then the pointer information from the pointer save stack 65 should be placed in the pointer check table 200 during step 1080. Thereafter, program control should return to the run-time error checking process at step 800 (FIG. 8).

The pointer check table 200 will be updated during step 1080 with the pointer information that was retrieved from the pointer save stack 65 during step 1064. Thereafter, program control will return to the run-time error checking process at step 800 (FIG. 8).

If it is determined during step 1060 (FIG. 10c) that the node does not contain a rdptrstk command, program control will proceed to step 1090.

A test is performed during step 1090 to determine if the node contains an UNKNOWN status indication. If it is determined during step 1090 that the node contains an UNKNOWN status indication, the evaluator 35 will set the status flag to UNKNOWN during step 1092 before the information that has been defined for the pointer being assigned is added during step 1094 to the appropriate row of the pointer check table 200. Thereafter, program control will return to the run-time error checking process at step 800 (FIG. 8).

If it is determined during step 1090 (FIG. 10c) that the node does not contain an UNKNOWN status indication, program control will proceed to step 1096.

If program execution reaches step 1096, the tblupd node cannot be characterized according to any of the above-established tests. Thus, an error message is generated during step 1096 before the run-time pointer table updating process is exited at step 1098.

The run-time pointer checking subroutine, illustrated in FIGS. 11a and 11b, will be entered at step 1104 if the node of internal pseudo-code being evaluated by the run-time error checking process includes a ptrchk command, as detected during step 840 (FIG. 8). As discussed above, the pointer checking subroutine will test the validity of each pointer that is being dereferenced.

The evaluator 35 will access the interpreter stack 60 to retrieve the address of the pointer being checked during step 1104. As noted above, the ptrchk command has been positioned in the parse tree such that when it is evaluated at run-time the address of the pointer being checked will be at the top of the interpreter stack 60. During step 1108, the evaluator 35 will utilize the pointer address retrieved from the interpreter stack 60 during step 1104 to locate the row in the pointer check table 200 for the pointer being checked.

A test is performed during step 1112 to determine if the status entry 260 in the pointer check table 200 has been set to PFUNC for the pointer being checked. If it is determined during step 1112 that the status is set to PFUNC, the address of the function will be retrieved from the internal symbol table 75 during step 1116. During step 1120 the "contents of pointer" entry 240 in the pointer check table 200 will be rewritten with the address that has been retrieved from the internal symbol table 75. This routine is implemented to ensure that the most recent version of the function that has been loaded into the interpreter 15 is executed. Thereafter, program control will proceed to step 1124.

A test is preferably performed during step 1124 to determine if the value recorded in the "contents of pointer" entry 240 in the pointer check table 200 equals the actual contents of the pointer. This preferred embodiment provides a supplemental mechanism to the wrapper function implementation described above for detecting modifications of pointers that have been performed by compiled code without the knowledge of the evaluator 35. Since the evaluator 35 was unaware of the previous modification, the pointer check table 200 was not properly updated.

If it is determined during step 1124 that these values are unequal, a previously undetected modification of this pointer has occurred. It is assumed that this modification has been validly performed by compiled code. Thus, during step 1128, the status flag for the pointer being checked is set to UNKNOWN and no additional checking is performed. In this manner, spurious warnings about valid pointer modifications by compiled code are prevented. Thereafter, program control will return to the run-time error checking process at step 800 (FIG. 8).

If it is determined during step 1124 that the recorded contents equal the actual contents of the pointer, program control will proceed to step 1132.

A test is performed during step 1132 to determine if the status entry 260 of the pointer check table 200 has been set to ILLEGAL for the pointer being checked. If it is determined during step 1132 that the status has been set to ILLEGAL, an error has occurred now that the constant null or negative pointer is being dereferenced. Accordingly, program control will proceed to a diagnostic subroutine, discussed below relative to FIG. 13.

If it is determined during step 1132 that the status entry 260 has not been set to ILLEGAL, program control will proceed to step 1140 (FIG. 11b).

A test is performed during step 1140 (FIG. 11b) to determine if the status entry 260 of the pointer check table 200 has been set to FREED for the pointer being checked. If it is determined during step 1140 that the status has been set to FREED, a freed memory access error has occurred, i.e., memory that has been deallocated is now improperly being accessed. Accordingly, program control will proceed to a diagnostic subroutine, discussed below relative to FIG. 13.

If it is determined during step 1140 that the status entry 260 has not been set to FREED, program control will proceed to step 1148.

A test is performed during step 1148 to determine if the status entry 260 of the pointer check table 200 has been set to BOUNDED for the pointer being checked. If it is determined during step 1148 that the status has been set to BOUNDED, a test is performed during step 1152 to determine if the actual contents of the pointer being checked is within the valid range as set forth in the valid memory bounds entries 250a, 250b of the pointer check table 200 for the pointer being checked. If it is determined during step 1152 that the retrieved pointer value was within the valid range, program control will return to the run-time error checking process at step 800 (FIG. 8).

If, however, it is determined during step 1152 that the retrieved pointer value was not within the valid range, a memory access error has occurred. Accordingly, program control will proceed to a diagnostic subroutine, discussed below relative to FIG. 13.

If it is determined during step 1148 that the status entry 260 has not been set to BOUNDED, program control will proceed to step 1160.

A test is performed during step 1160 to determine if the status entry 260 of the pointer check table 200 has been set to ALLOCATED for the pointer being checked. If it is determined during step 1160 that the status has been set to ALLOCATED, a test is performed during step 1162 to determine if the contents of the pointer is within the valid range for the allocated memory, as defined by the lower and upper bound entries 282, 284 of the associated memory allocation structure 280, illustrated in FIG. 2e.

If it is determined during step 1162 that the contents of the pointer is not within the valid range for the allocated memory, a memory error has occurred. Accordingly, program control will proceed to a diagnostic subroutine, discussed below relative to FIG. 13.

If it is determined during step 1162 that the contents of the pointer is within the valid range for the allocated memory, a test is performed during step 1164 to determine if the pointer is being dereferenced to READ or WRITE to the allocated memory. If it is determined during step 1164 that the pointer is being dereferenced to WRITE to allocated memory, the appropriate bits of the initialization bit vector 288, described above, will be updated to indicate the new initialized status of the corresponding bytes of allocated memory during step 1168. Thereafter, program control will return to the run-time error checking process at step 800 (FIG. 8).

If it is determined during step 1164 that the pointer is being dereferenced to READ allocated memory, the appropriate bits of the initialization bit vector 288 are accessed to determine if the corresponding bytes of allocated memory have been initialized. A test is performed during step 1174 to determine if the allocated bytes being READ have been initialized. If it is determined during step 1174 that these bytes have not been initialized, a memory access error has occurred. Accordingly, program control will proceed to a diagnostic subroutine, discussed below relative to FIG. 13.

If it is determined during step 1174 that the bytes have been initialized, program control will return to the run-time error checking process at step 800 (FIG. 8).

If it is determined during step 1160 that the status has not been set to ALLOCATED, then program control will proceed to step 1176. If program execution reaches step 1176, the information recorded in the status entry 260 cannot be characterized according to any of the above-established tests. Thus, an error message is generated during step 1176 before the run-time pointer checking process is exited.

Figure 12A:
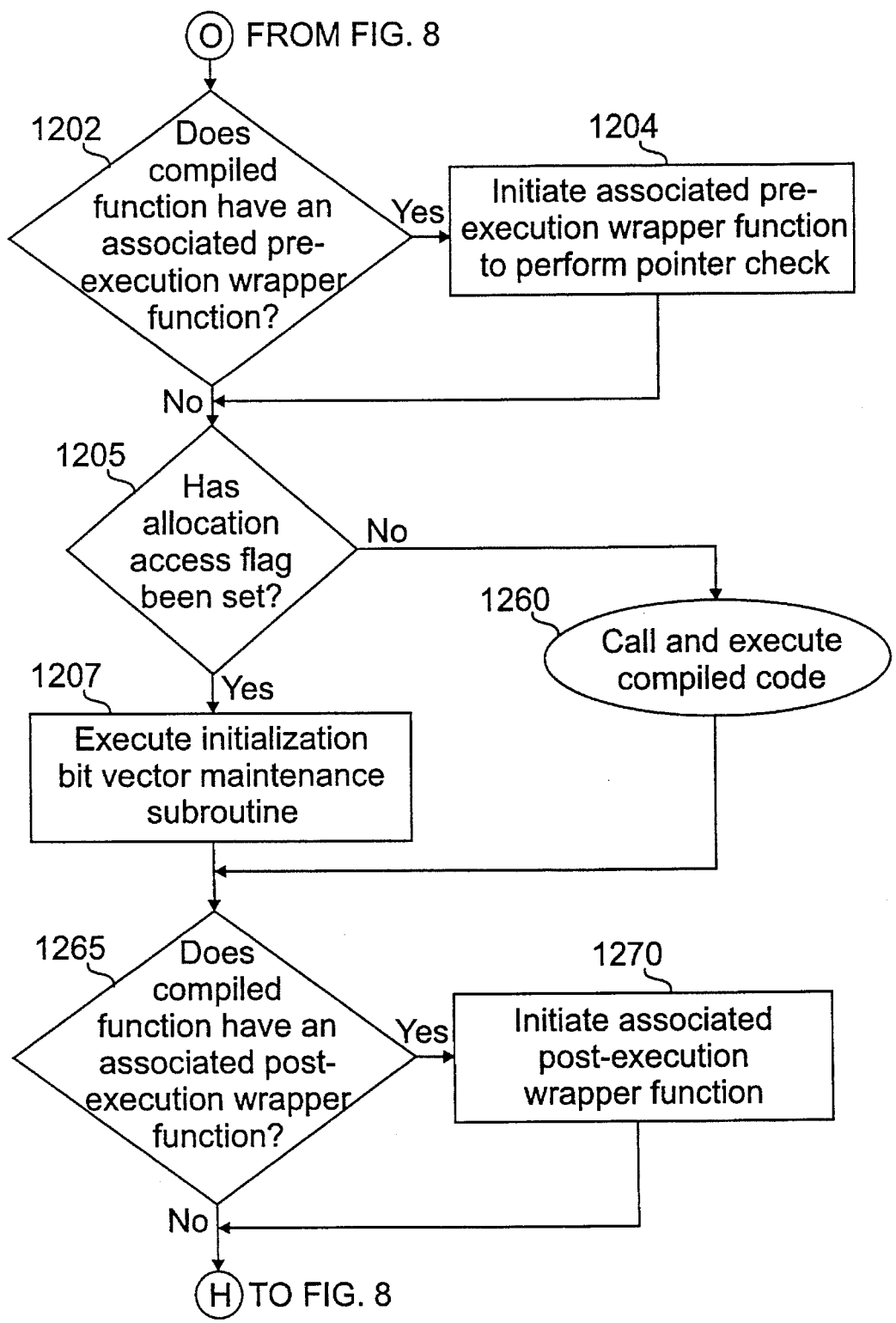
FIG. 12a is a flow chart describing an exemplary compiled function error checking process as utilized by the error checking process of FIG. 8.

A compiled function error checking process, illustrated in FIG. 12a, will be entered at step 1202 if the node of internal pseudo-code being evaluated by the run-time error checking process includes a call command for a compiled function, as detected during step 850 (FIG. 8). The compiled function error checking process provides a mechanism for initiating wrapper functions that may be associated with a given compiled function, as well as initiating an initialization bit vector maintenance subroutine, illustrated in FIG. 12b, if the compiled function that is called has access to allocated regions of memory, as discussed further below.

A test is performed by the compiled function error checking process at step 1202 to determine if the called compiled function has an associated pre-execution wrapper function.

If it is determined during step 1202 that the called compiled function does have an associated pre-execution wrapper function, the pre-execution wrapper function is executed during step 1204 in order to perform any necessary pointer checks and other functions, as described above. The pre-execution wrapper function is passed the same arguments as the associated compiled object code function. Thereafter, program control will proceed to step 1205.

If it is determined during step 1202 that the called compiled function does not have an associated pre-execution wrapper function, program control will proceed to step 1205. A test is performed during step 1205 to determine if the allocation access flag has been set in the entry in the internal symbol table 75 corresponding to the called compiled function. The allocation access flag was set at read-time during step 337 if the function has access to any allocated memory.

Figures 12B, 13:
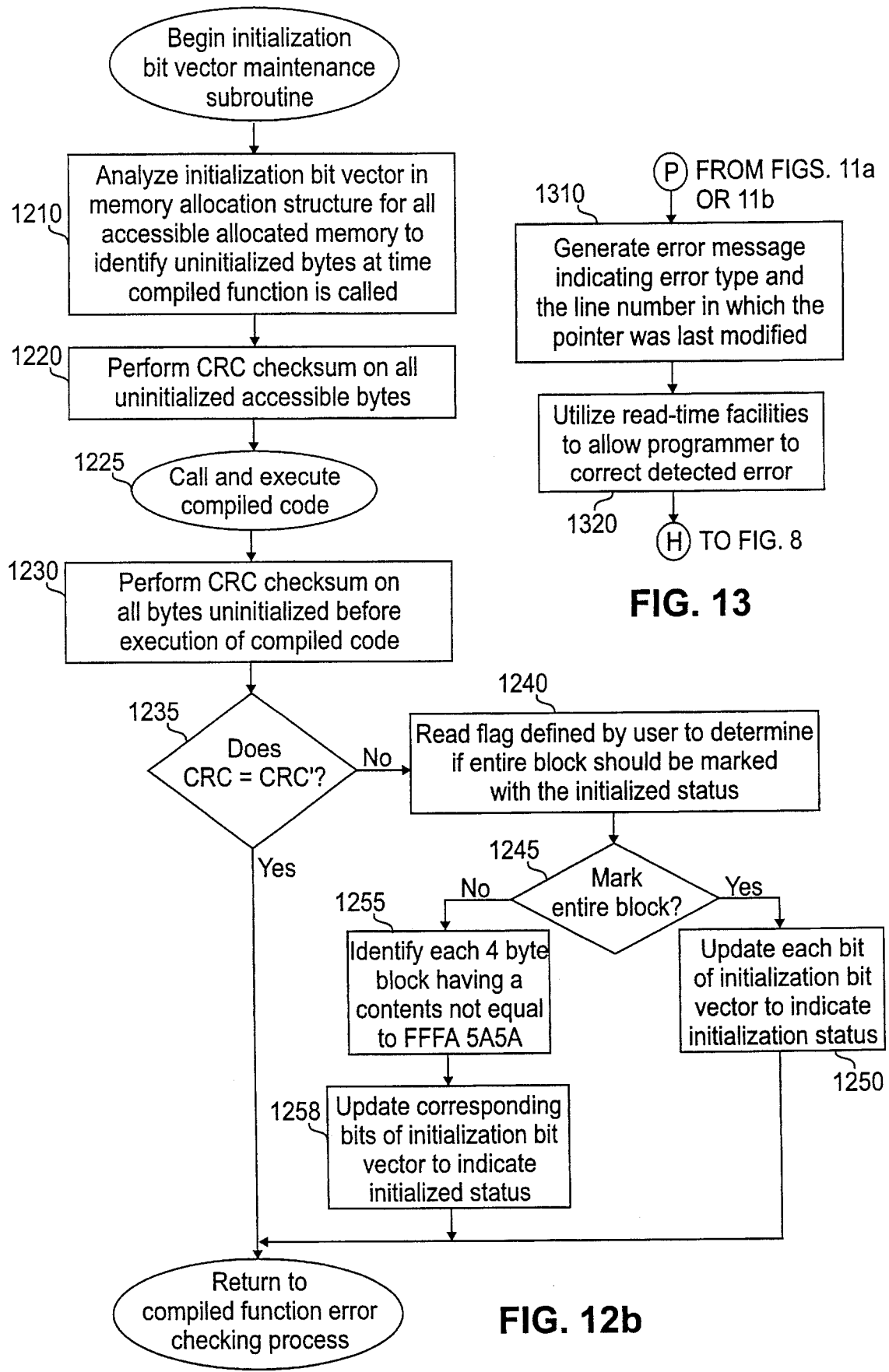

If it is determined during step 1205 that the allocation access flag has been set, an initialization bit vector maintenance subroutine, illustrated in FIG. 12b, will be executed during step 1207. The initialization bit vector maintenance subroutine, which will be entered at step 1210, provides a mechanism for detecting initializations of allocated memory by a compiled function, which would normally not be detected by the interpreter 15. It is noted that initializations of allocated memory by an interpreted function will be detected during execution of steps 1164 and 1168 of the pointer checking subroutine illustrated in FIG. 11b. In this manner, the initialization bit vector 288 will properly record the initialization status of each corresponding byte of allocated memory, regardless of whether the initialization was performed by compiled or interpreted code.

As discussed above, a preferred embodiment of the invention pre-marks all uninitialized automatic variables and allocated memory regions with a known four byte hexadecimal word, such as FFFA 5A5A, in order to facilitate the detection of memory initializations.

During step 1210, the evaluator 35 analyzes each bit of the initialization bit vector 288 that corresponds to an allocated byte that may be accessed by the compiled function, in order to identify all of the corresponding bytes that are uninitialized at the time the compiled function is called.

The evaluator 35 will then perform a cyclic redundancy check (CRC) checksum during step 1220 on all of the uninitialized bytes that may be accessed by the compiled code. During step 1225 the compiled function is called with the proper arguments and executed. Following execution of the compiled code, program control will return to step 1230, wherein a second CRC checksum is performed on all of the bytes that were accessible by the compiled code and uninitialized before execution of the compiled code.

A test is performed during step 1235 to determine if the value of any byte has changed by testing if the results of the CRC checksum that was performed during step 1220 equals the results of the CRC checksum that was performed during step 230. If it is determined during step 1235, that the two checksum values are unequal, then program control will proceed to step 1240.

During step 1240, a user-defined flag is analyzed to determine if the entire block of allocated memory should be marked as initialized or if only those bytes within the block that have been initialized should be marked as initialized. Preferably, the user-defined flag may be set by the user at the start of each software debugging session. The user-defined flag allows the user to prevent spurious generation of errors that result from a compiled function initializing memory with the known pre-marked hexadecimal value, i.e., initializing memory to the hexadecimal value FFFA 5A5A.

A test is performed during step 1245 to determine if the user-defined flag has been set to indicate that the entire block of allocated memory should be marked with an initialized status, even where only a single byte may have been initialized by the compiled code, or, alternatively, if only those bytes that are determined to be initialized should be marked with an initialized status. If it is determined during step 1245 that the user has specified that the entire block of allocated memory be marked as initialized, then each bit in the initialization bit vector 288 is updated during step 1250 to indicate the initialized status.

If it is determined during step 1245 that the user has specified that only those bytes that are actually initialized should be marked with an initialized status, then program control will proceed to step 1255. During step 1255, each four byte block in the allocated region that has a contents other than FFFA 5A5A is identified, i.e., those bytes that no longer have the known pre-marked value. Thereafter, the corresponding bits in the initialization bit vector 288 are updated to indicate the initialized status during step 1258.

In an alternate embodiment, all of the bytes of uninitialized memory that the compiled function may access are saved prior to executing the compiled code during step 1225. In this manner, if it is determined during step 1235 that the compiled code has initialized allocated memory, then the initialized bytes may be identified during step 1255 by comparing the current contents of the uninitialized and accessible bytes to the values stored prior to execution of the compiled object code. In this embodiment, it is unnecessary to pre-mark allocated memory regions with known values, i.e., the hexadecimal word FFFA 5A5A.

Following execution of step 1250 or 1258, or if it is determined during step 1235 that the compiled code did not initialize any bytes of allocated memory, program control will return to the compiled function error checking process at step 1265 (FIG. 12a).

If it is determined during step 1205 (FIG. 12a) that the allocation flag has not been set, the called compiled function cannot access any allocated memory, and there is no need to run the initialization bit vector maintenance subroutine. Thus, if the flag has not been set, the compiled object code will be called with the proper arguments and executed during step 1260. After the compiled object code has been executed, it will return to the compiled function error checking process at step 1265 (FIG. 12a).

A test is performed by the compiled function error checking process at step 1265 to determine if the called compiled function has an associated post-execution wrapper function. If it is determined during step 1265 that the called compiled function does have an associated post-execution wrapper function, the post-execution wrapper function will be executed during step 1270 with the values returned by the associated compiled object code function. The post-execution wrapper function will perform any necessary pointer table updating tasks for returned or created pointers, as well as any other tasks that may be necessary, as described above. Thereafter, program control will return to the run-time error checking process at step 800 (FIG. 8).

If an error is detected during execution of the pointer check subroutine, illustrated in FIGS. 11a and 11b, i.e., upon failure of the test conditions of steps 1132, 1140, 1152, 1162 or 1174, program control will proceed to the diagnostic subroutine illustrated in FIG. 13.

When the diagnostic subroutine is entered at step 1310, an error message is generated which includes diagnostic information, i.e., an indication of the type of memory access error and the line number in which the pointer was last modified, as retrieved from the file/line number entry 270 of the pointer check table 200. Thereafter, the programmer is provided with access to the read-time facilities, discussed above, during step 1320, in order to correct the detected error. Upon the programmer's correction of the error, program control will return to the run-time error checking process at step 800 (FIG. 8).

IDENTIFYING MEMORY LEAKS AND THE SOURCE OF UNDETECTED POINTER MODIFICATIONS

According to a further feature of the invention, memory leaks, i.e., memory spaces that have been allocated but are no longer accessible, may be detected automatically, or upon user initiation of a memory leak detection algorithm. Memory leaks typically result when a pointer that points to a first block of allocated memory is reassigned to point to a second block of allocated memory, without deallocating the first block. As is well-known, memory leaks result in the cumulative degradation of overall performance.

As discussed above, upon the allocation of a block of memory by a memory allocation function, an associated memory allocation structure 280, illustrated in FIG. 2e, is preferably created by the associated post-execution wrapper function. The memory allocation structure 280 records certain information, described above, about the allocated memory, including, e.g., a list in the chain list member 286 of all the pointers currently pointing to the associated block of allocated memory.

As indicated above, each time a new pointer is assigned to point to the allocated memory, the new pointer is added to the chain list. Similarly, each time a pointer that previously pointed to a first block of allocated memory is reassigned to point to a second block of allocated memory, the pointer is preferably removed from the chain list associated with the first block before it is added to the chain list associated with the second block.

Accordingly, the information recorded in the chain list member 286 of the memory allocation structure 280 indicates only those pointers that currently point to the associated block of allocated memory. Thus, if the contents of the chain list member 286 are empty, there are no longer any pointers pointing to the allocated memory which may be utilized to access the allocated memory. Thus, a memory leak has occurred and an error message should be generated.

As discussed above, the run-time pointer checking subroutine, illustrated in FIGS. 11a and 11b, provides a supplemental mechanism at steps 1124 and 1128 for detecting when a pointer has been modified by compiled code without the knowledge of the evaluator 35. Since the evaluator 35 was unaware of the previous modification by the compiled code, the pointer check table 200 was not properly updated at the time of the modification. The supplemental mechanism sets the status flag for the pointer being checked to UNKNOWN and performs no additional pointer checking. Although this routine prevents spurious warnings about valid pointer modifications by compiled code, it would be preferred to detect each modification by the compiled code so that the modified value can be placed in the pointer check table 200.

Thus, a mechanism is preferably provided to allow a user to search the status entries 260 of each row of the pointer check table 200, in order to identify all pointers having an UNKNOWN status. For each pointer having an UNKNOWN status, a diagnostic message is generated which identifies the respective pointer, together with the information from the file/line number entry 270. The line number information will indicate the last time the pointer was updated. The programmer can then utilize the diagnostic information to identify the compiled function that has modified the pointer value without the interpreter's knowledge. Thereafter, a post-execution wrapper function may be written for the compiled code, in the manner described above, which will add the new pointer information to the pointer check table 200 following execution of the compiled function, in order to prevent the further occurrence of the UNKNOWN status.

During program development, programmers frequently wish to reset the interpreter 15 by initiating a reset command, such as a CIN reset command. As is well-known, this command instructs the interpreter 15 to return to the same status that it was in upon completion of the read-time processing. Effectively, this results in all data being reinitialized to their original values, as well as "BSS" data being assigned to 0.

Preferably, the pointer check table 200 is returned to the same status upon execution of a CIN reset command that the pointer check table 200 was in upon completion of read-time processing as well. Thus, the pointer check table 200 should be reinitialized and then reloaded with any initializations that were preloaded into the pointer check table 200 prior to running any internal pseudo-code, as discussed above, i.e., for static pointers that are initialized to point at other static data and for the argv pointer argument that is passed into the main function.

It is to be understood that the embodiments and variations shown and described herein are illustrative of the principles of this invention only and that various modifications may be implemented by those skilled in the art without departing from the scope and spirit of the invention.

We claim:

1. A method of generating executable code for a program from source code for the program, the executable code including pointer checking code which checks memory references made by dereferencing pointers, the method comprising the steps of:

performing an analysis based on the source code to identify certain memory references which are made by dereferencing pointers and which need not be checked; and responding to the analysis by generating the executable code without pointer checking code that checks the certain memory references.

2. The method of claim 1, wherein the step of performing comprises the step of eliminating overlapping pointer checks.

3. The method of claim 2, wherein each of the dereferencing pointers is associated with one of a plurality of flow sets, wherein the step of responding comprises the step of establishing a single pointer check for each flow set having one or more pointer dereferences.

4. A method of generating executable code for a program from source code for the program, the executable code including pointer checking code which checks memory references made by dereferencing pointers, the method comprising the steps of:

performing an analysis based on the source code to identify certain memory references which are made by dereferencing pointers and which need not be checked; and responding to the analysis by generating the executable code without pointer checking code that checks the certain memory references, wherein the program is executed by a software generation system, and wherein the program comprises one or more library functions, said software generation system maintaining pointer information on each of said dereferencing pointers, the method further comprising the steps of:

establishing a flow set for each of said dereferencing pointers; and performing an analysis routine on each line of the source code, said analysis routine comprising the steps of:

(i) establishing a new flow set each time said software generation system detects an assignment of a new value to one of the dereferencing pointers in said line of the source code; and (ii) marking the current flow set associated with a dereferenced pointer with an indication that said dereferenced pointer has been dereferenced in said line of the source code; and performing a single pointer check for each of said flow sets having one or more pointer dereferences, said pointer check having an expanded offset for each of said identified flow sets having a plurality of pointer dereferences.

5. The method of claim 4, further including the step of evaluating the flow sets at read-time following completion of said analysis to detect the dereferencing of an unitialized dereferencing pointer by determining if a flow set indicates that a dereferencing pointer has been dereferenced before it has been assigned a legal value.

6. The method of claim 4, wherein the analysis routine further includes the step of marking each current flow set with an indication that said line of the source code includes a call to one of said library functions.

7. The method of claim 6, further including the steps of:

evaluating said flow sets at read-time following completion of said analysis routine; and initiating a compiled code flow analysis routine at run-time if a flow set associated with a dereferencing pointer includes the calling of one of said library functions among a plurality of pointer dereferences and if said library function can access said pointer associated with said flow set, said compiled code flow analysis routine comprising the steps of:

performing a test following execution of said library function at run-time to determine if a pointer value associated with said flow set has been modified by said library function; and performing an additional pointer check for those pointer dereferences that are in said flow set following said call to said library function only if said pointer value associated with said dereferenced pointer has been modified by said library function.

8. The method of claim 6, wherein said library function includes one or more dereferencing pointers, said software generation system maintaining pointer information on each of said pointers, said pointer information including the valid memory range of said associated pointer, said method further comprising the steps of:

executing said library function; and detecting the dereferencing of an invalid pointer by said library function, wherein the step of detecting comprises the steps of:

(a) associating a wrapper function with said library function, said wrapper function retrieving said pointer information associated with each of said pointers that are dereferenced by said library function and determining if said memory space pointed to by the actual contents of each of said dereferenced pointers is within said valid memory range retrieved from said associated pointer information; and (b) executing said wrapper function prior to executing said associated library function.

9. The method of claim 6, wherein said library function includes one or more dereferencing pointers, said software generation system maintaining pointer information on each of said pointers, said method comprising the steps of:

executing said library function; and updating pointer information associated with a pointer that is created during said step of executing, wherein the step of updating comprises the steps of:

(a) associating a wrapper function with said library function, said wrapper function storing said pointer information associated with said pointer created by said library function; and (b) executing said wrapper function following execution of said associated library function.

10. The method of claim 6 further comprising the steps of:

executing said library function;

returning a pointer value from said library function to said source code;

assigning said pointer value to one of the dereferencing pointers; and updating pointer information associated with said pointer value, wherein the step of updating comprises the steps of:

(i) associating a wrapper function with said library function, said wrapper function storing said pointer information associated with said returned pointer value in a memory location;

(ii) executing said wrapper function following execution of said associated library function; and (iii) retrieving said pointer information from said memory location for placement in a pointer check table upon said assignment of said returned pointer value to said dereferencing pointer.

11. A method of generating executable code for a program from source code for the program, the executable code including pointer checking code which checks memory references made by dereferencing pointers, each of which is associated with one of a plurality of flow sets, the method comprising the steps of:

performing an analysis based on the source code to identify certain memory references which are made by dereferencing pointers and which need not be checked, wherein the step of performing comprises the step of eliminating overlapping pointer checks; and responding to the analysis by generating the executable code without pointer checking code that checks the certain memory references, wherein the step of responding comprises the step of establishing a single pointer check for each flow set having one or more pointer dereferences and wherein the step of establishing a single pointer check comprises the step of establishing, for each of the flow sets having a plurality of pointer dereferences, a pointer check having an expanded offset.

12. A method of generating executable code for a program from source code for the program, the executable code including pointer checking code which checks memory references made by dereferencing pointers, the method comprising the steps of:

performing an analysis based on the source code to identify certain memory references which are made by dereferencing pointers and which need not be checked; and responding to the analysis by generating the executable code without pointer checking code that checks the certain memory references, wherein the program comprises a complex expression and is executed by a software generation system, said complex expression containing a plurality of instruction streams, each of said instruction streams having a pointer expression, said software generation system maintaining pointer information on each of said dereferencing pointers, said method further comprising the steps of:

allocating a memory location for temporary storage of pointer information;

placing a command in each of said instruction streams, only one of said instruction streams being executed by said software generation system at run-time, said command causing said software generation system to retrieve the pointer information associated with the pointer expression in said executed instruction stream and to place said retrieved pointer information in said temporary memory location; and retrieving said pointer information from said temporary memory location upon said pointer's dereferencing of said complex expression at run-time.

* * * * *